United States Patent
Zhang et al.

(10) Patent No.: US 10,986,622 B2
(45) Date of Patent: Apr. 20, 2021

(54) USER EQUIPMENT (UE) DOWNLINK TRANSMISSION CONFIGURATION INDICATION (TCI)-STATE SELECTION

(71) Applicant: Apple Inc., Cupertino, CA (US)

(72) Inventors: Yushu Zhang, Beijing (CN); Guotong Wang, Beijing (CN); Gang Xiong, Portland, OR (US); Bishwarup Mondal, San Ramon, CA (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/406,594

(22) Filed: May 8, 2019

(65) Prior Publication Data

US 2019/0281587 A1 Sep. 12, 2019

Related U.S. Application Data

(63) Continuation-in-part of application No. PCT/CN2018/103288, filed on Aug. 30, 2018.

(60) Provisional application No. 62/669,916, filed on May 10, 2018.

(51) Int. Cl.
*H04W 72/04* (2009.01)
*H04W 72/10* (2009.01)

(52) U.S. Cl.
CPC ........ *H04W 72/042* (2013.01); *H04W 72/10* (2013.01)

(58) Field of Classification Search
CPC .. H04W 72/042; H04W 72/10; H04L 5/0044; H04L 5/0094; H04L 5/0053; H04L 1/0026; H04B 7/088; H04B 7/0695
See application file for complete search history.

(56) References Cited

U.S. PATENT DOCUMENTS

| | | | | |
|---|---|---|---|---|
| 2019/0141693 | A1* | 5/2019 | Guo | H04L 5/0044 |
| 2019/0260445 | A1* | 8/2019 | Wilson | H04B 7/0634 |
| 2019/0268118 | A1* | 8/2019 | Sadiq | H04B 7/0617 |
| 2019/0334603 | A1* | 10/2019 | Venugopal | H04B 7/0632 |

* cited by examiner

*Primary Examiner* — Ashley Shivers
(74) *Attorney, Agent, or Firm* — Eschweiler & Potashnik, LLC

(57) ABSTRACT

Systems, apparatuses, methods, and computer-readable media are provided for selecting a TCI-State for receiving downlink transmissions. In one example a processor/UE is configured to determine one or more candidate TCIs for a downlink slot; determine a scheduling offset between a physical downlink shared channel (PDSCH) and a physical downlink control channel (PDCCH); prioritize the candidate TCIs based on the scheduling offset; identify a highest priority candidate TCI; and select the highest priority candidate TCI for receiving the PDSCH.

30 Claims, 9 Drawing Sheets

USER EQUIPMENT (UE) DOWNLINK TRANSMISSION CONFIGURATION INDICATION (TCI)-STATE SELECTION

CROSS REFERENCE TO RELATED APPLICATIONS

This application claims priority to U.S. Provisional Patent Application No. 62/669,916 filed on May 10, 2018, entitled "SYSTEM AND METHOD FOR UE DOWNLINK QCL ASSUMPTION", and is a Continuation-in-Part of PCT Patent Application PCT/CN2018/103288 filed on Aug. 30, 2018, entitled "USER EQUIPMENT (UE) DOWNLINK QUASI CO-LOCATION (QCL) ASSUMPTION", which are incorporated herein by reference for all purposes.

BACKGROUND

Various embodiments generally may relate to the field of wireless communications.

DETAILED DESCRIPTION

Figure 1:
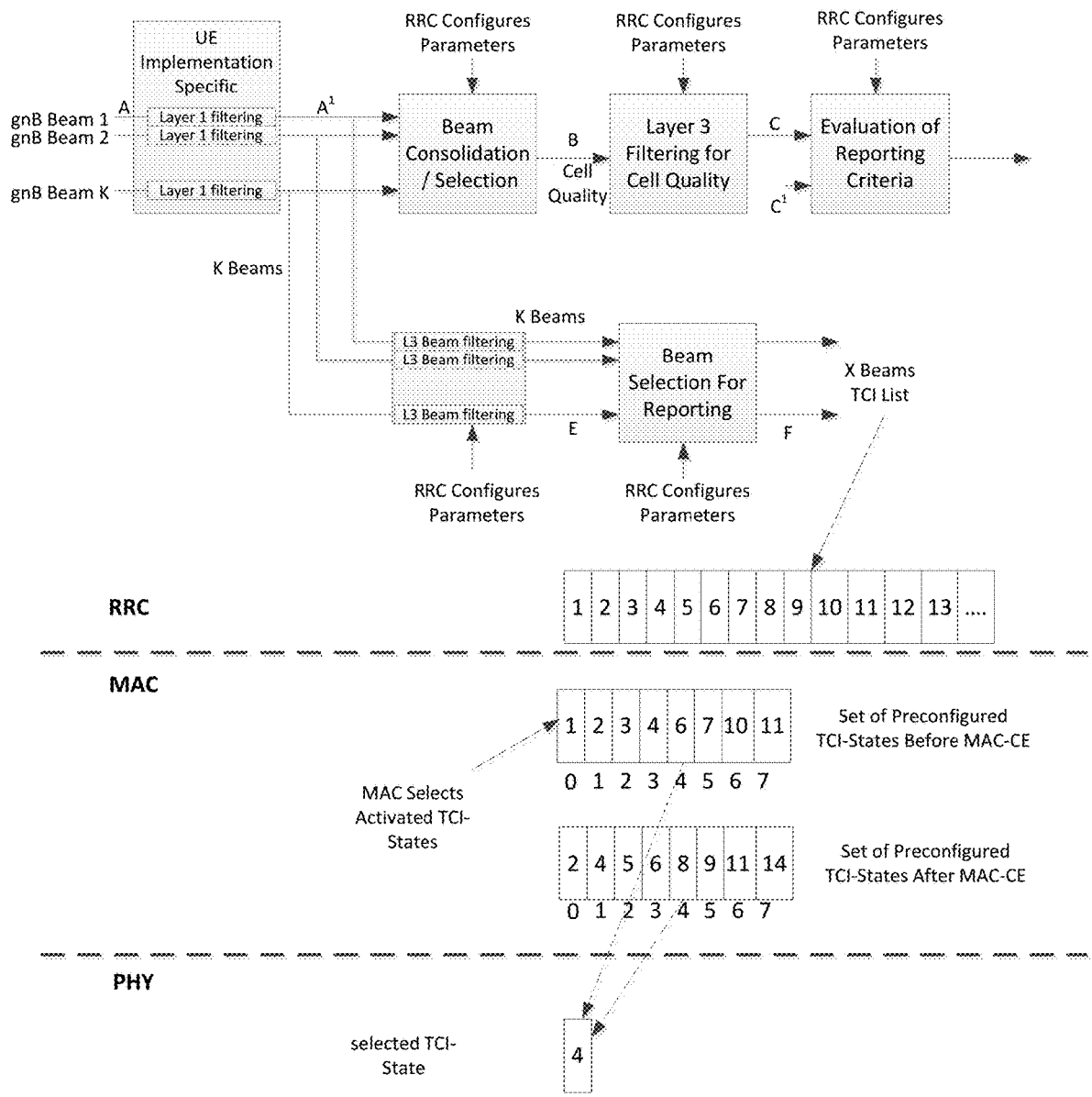
FIG. 1 depicts an exemplary beam management and selection model in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In 5G systems, gNBs and UEs may maintain a plurality of beams. A good gNB-UE beam pair can help to increase the link budget. An Antenna Port (AP) QCL can be used to indicate the downlink Tx and Rx beam, where the Rx beam can be indicated by QCL with a Rx parameter, which is defined as QCL type-D. The QCL information is configured in one TCI.

Beam management refers to a set of L1/L2 procedures to acquire and maintain a set of transmission/reception point(s) (TRP or TRxP) and/or UE beams that can be used for DL and UL transmission/reception. Beam management includes various operations or procedures, such as beam determination, beam management, beam reporting, and beam sweeping operations/procedures. Beam determination refers to TRxP(s) or UE ability to select of its own Tx/Rx beam(s). Beam measurement refers to TRP or UE ability to measure characteristics of received beamformed signals. Beam reporting refers the UE ability to report information of beamformed signal(s) based on beam measurement. Beam sweeping refers to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management includes procedures P-1, P-2, and P-3. Procedure P-1 is used to enable UE measurement on different TRxP Tx beams to support selection of TRxP Tx beams/UE Rx beam(s). For beamforming at TRxP, procedure P-1 typically includes a intra/inter-TRxP Tx beam sweep from a set of different beams. For beamforming at the UE, procedure P-1 typically includes a UE Rx beam sweep from a set of different beams.

Procedure P-2 is used to enable UE measurement on different TRxP Tx beams to possibly change inter/intra-TRxP Tx beam(s). Procedure P-2 may be a special case of procedure P-1 wherein procedure P-2 is used for a possibly smaller set of beams for beam refinement than procedure P-1. Procedure P-3 is used to enable UE measurement on the same TRxP Tx beam to change UE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE reports measurement results of N selected Tx beams (where N may or may not be a fixed number). The procedure based on RS for mobility purpose is not precluded. Beam information that is to be reported includes measurement quantities for the N beam(s) and information indicating N DL Tx beam(s), if N<K. Other information or data may be included in or with the beam information. When a UE is configured with K'>1 non-zero power (NZP) CSI-RS resources, a UE can report N' CSI-RS Resource Indicator (CRIs).

The UE can trigger a mechanism to recover from beam failure, which is referred to a "beam recovery", "beam failure recovery request procedure", and/or the like. A beam failure event may occur when the quality of beam pair link(s) of an associated control channel falls below a threshold, when a time-out of an associated timer occurs, or the like. The beam recovery mechanism is triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal is supported for allowing the UE to monitor the beams for identifying new potential beams.

For beam failure recovery, a beam failure may be declared if one, multiple, or all serving PDCCH beams fail. The beam failure recovery request procedure is initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the UE.

Beam management also includes providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

DL beam indications are based on a Transmission Configuration Indication (TCI) state(s). The TCI-State(s) are indicated in a TCI list that is configured by radio resource control (RRC) and/or Media Access Control (MAC) Control Element (CE).

Antenna Port Quasi Co-Location

As illustrated in FIG. 1, the UE can be configured by the gNB with a list of up to M preconfigured TCI-States configurations within the higher layer parameter PDSCH-Config to decode PDSCH according to a detected PDCCH with DCI intended for the UE and the given serving cell, where M depends on the UE capability. Each TCI-State contains parameters for configuring a quasi co-location relationship between one or two downlink reference signals and the DM-RS ports of the PDSCH. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS is given by the higher layer parameter qcl-Type in QCL-Info and may take one of the following values: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE receives an activation command used to map up to 8 TCI-States to the codepoints (illustrated as indexed 1-8 in FIG. 1) of the DCI field 'Transmission Configuration Indication'. When the HARQ-ACK corresponding to the PDSCH carrying the activation command is transmitted in slot n, the indicated mapping between TCI-States and codepoints of the DCI field 'Transmission Configuration Indication' should be applied starting from slot $n+3N_{slot}^{subframe,\mu}+1$. After the UE receives the higher layer configuration of TCI-States and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, for determining PDSCH antenna port quasi co-location, the UE assumes that the TCI-State for the PDSCH is identical to the TCI-State applied for the CORESET used for the PDCCH transmission.

If the tci-PresentInDCI is set as 'enabled', when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI-State with respect to the QCL type parameter(s) given by the indicated TCI-State if the time offset between the reception of the DL DCI and the corresponding PDSCH is equal to or greater than a threshold Threshold-Sched-Offset, where the threshold is based on reported UE capability.

For both the cases when tci-PresentInDCI is set to 'enabled' and tci-PresentInDCI is not configured, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI-State with respect to the QCL parameter(s) used for PDCCH quasi co-location indication of the lowest CORESET-ID in the latest slot in which one or more CORESETs within the active BWP of the serving cell are configured for the UE. If none of configured TCI-States contains 'QCL-TypeD', the UE shall obtain the other QCL assumptions from the indicated TCI-States for its scheduled PDSCH irrespective of the time offset between the reception of the DL DCI and the corresponding PDSCH.

For a periodic CSI-RS resource in a NZP-CSI-RS-ResourceSet configured with higher layer parameter trs-Info, the UE shall expect that a TCI-State indicates one of the following quasi-colocation type(s):
- 'QCL-TypeC' with an SS/PBCH block and, when applicable, 'QCL-TypeD' with the same SS/PBCH block, or
- 'QCL-TypeC' with an SS/PBCH block and, when applicable, 'QCL-TypeD' with a CSI-RS resource in an NZP-CSI-RS-ResourceSet configured with higher layer parameter repetition, or For an aperiodic CSI-RS resource in a NZP-CSI-RS-ResourceSet configured with higher layer parameter trs-Info, the UE shall expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with an SS/PBCH block, or
- 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or
- 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or
- 'QCL-TypeC' with an SS/PBCH block and, when applicable, 'QCL-TypeD' with the same SS/PBCH block.

For the DM-RS of PDCCH, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- 'QCL-TypeA' with a CSI-RS resource in a NZP-CSI-RS-ResourceSet configured without higher layer parameter trs-Info and without repetition, when 'QCL-TypeD' is not applicable.

For the DM-RS of PDSCH, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- QCL-TypeA' with CSI-RS resource in a NZP-CSI-RS-ResourceSet configured without higher layer parameter trs-Info and without repetition and, when applicable, 'QCL-TypeD' with the same CSI-RS resource.

A beam failure recovery request could be delivered over dedicated PRACH or PUCCH resources. For example, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets (CORESET) that the UE is configured for monitoring PDCCH.

The physical layer of a UE assesses the radio link quality according to a set $\bar{q}_0$ of resource configurations against a threshold Qout,LR. The threshold Qout,LR corresponds to a default value of higher layer parameter RLM-IS-OOS-thresholdConfig and Beam-failure-candidate-beam-threshold, respectively. For the set $\bar{q}_0$, the UE assesses the radio link quality only according to periodic CSI-RS resource configurations or SS/PBCH blocks that are quasi co-located, with the DM-RS of PDCCH receptions DM-RS monitored by the UE. The UE applies the configured Qin,LR threshold for the periodic CSI-RS resource configurations. The UE applies the Qout,LR threshold for SS/PBCH blocks after scaling a SS/PBCH block transmission power with a value provided by higher layer parameter Pc_SS.

If a beam failure indication has been received by a MAC entity from lower layers, then the MAC entity starts a beam failure recovery timer (beamFailureRecoveryTimer) and initiates a Random Access procedure. If the beamFailureRecoveryTimer expires, then the MAC entity indicates a beam failure recovery request failure to upper layers. If a DL assignment or UL grant has been received (e.g., on a PDCCH addressed for a cell radio network temporary identifier (C-RNTI)), then the MAC entity may stop and reset beamFailureRecoveryTimer and consider the beam failure recovery request procedure to be successfully completed.

Beam Measurement

The UE in the RRC_CONNECTED mode is to measure one or multiple beams of a cell, and the measurement results (e.g., power values) are averaged to derive the cell quality.

The UE derives cell measurement results by measuring one or multiple beams associated per cell as configured by the network. For all cell measurement results in RRC_CO- NNECTED mode, the UE applies layer 4 filtering before using the measured results for evaluation of reporting criteria and measurement reporting. For cell measurements, the network can configure RSRP, RSRQ, and/or SINR as a trigger quantity. Reporting quantities can be the same as the trigger quantity or combinations of quantities (e.g., RSRP and RSRQ; RSRP and SINR; RSRQ and SINR; RSRP, RSRQ and SINR).

The network may also configure the UE to report measurement information per beam, which can either be measurement results per beam with respective beam identifier(s) or only beam identifier(s)). If beam measurement information is configured to be included in measurement reports, the UE applies the layer 4 beam filtering. However, the exact layer 2 filtering of beam measurements used to derive cell measurement results is implementation dependent.

The UE may be configured to consider a subset of the detected beams, such as the N best beams above an absolute threshold. Filtering takes place at two different levels include at the physical layer (PHY) to derive beam quality and then at the RRC level to derive cell quality from multiple beams. Cell quality from beam measurements may be derived in the same way for the serving cell(s) and for the non-serving cell(s).

Measurement reports contain the measurement results of the X best beams if the UE is configured to do so by the gNB. For channel state estimation purposes, the UE may be configured to measure CSI-RS resources and estimate a downlink channel state based on the CSI-RS measurements. The UE feeds the estimated channel state back to the gNB to be used in link adaptation.

An example measurement model is shown by FIG. 1. In FIG. 1, point A includes measurements (e.g., beam specific samples) internal to the PHY. Layer 2 (L1) filtering includes internal layer 2 filtering circuitry for filtering the inputs measured at point A. The exact filtering mechanisms and how the measurements are actually executed at the PHY may be implementation specific. The measurements (e.g., beam specific measurements) are reported by the L1 filtering to layer 4 (L3) beam filtering circuitry and the beam consolidation/selection circuitry at point A1.

The Beam Consolidation/Selection circuitry includes circuitry where beam specific measurements are consolidated to derive cell quality. For example, if N>1, else when N=2 the best beam measurement may be selected to derive cell quality. The configuration of the beam is provided by RRC signaling. A measurement (e.g., cell quality) derived from the beam-specific measurements are then be reported to L3 filtering for cell quality circuitry after beam consolidation/selection. In some embodiments, the reporting period at point B may be equal to one measurement period at point A1.

The L3 filtering for cell quality circuitry is configured to filter the measurements provided at point B. The configuration of the Layer 4 filters is provided by the aforementioned RRC signaling or different/separate RRC signaling. In some embodiments, the filtering reporting period at point C may be equal to one measurement period at point B. A measurement after processing in the layer 4 filter circuitry is provided to the evaluation of reporting criteria circuitry at point C. In some embodiments, the reporting rate may be identical to the reporting rate at point B. This measurement input may be used for one or more evaluation of reporting criteria.

Evaluation of reporting criteria circuitry is configured to check whether actual measurement reporting is necessary at point D. The evaluation can be based on more than one flow of measurements at reference point C. In one example, the evaluation may involve a comparison between different measurements, such as a measurement provided at point C and another measurement provided at point C1. In embodiments, the UE may evaluate the reporting criteria at least every time a new measurement result is reported at point C, C1. The reporting criteria configuration is provided by the aforementioned RRC signaling (UE measurements) or different/separate RRC signaling. After the evaluation, measurement report information (e.g., as a message) is sent on the radio interface at point D.

Referring back to point A1, measurements provided at point A1 are provided to L3 Beam filtering circuitry, which is configured to perform beam filtering of the provided measurements (e.g., beam specific measurements). The configuration of the beam filters is provided by the aforementioned RRC signaling or different/separate RRC signaling. In embodiments, the filtering reporting period at point E may be equal to one measurement period at A1. The K beams may correspond to the measurements on New Radio (NR)-synchronization signal (SS) block (SSB) or Channel State Information Reference Signal (CSI-RS) resources configured for L3 mobility by a gNB and detected by the UE at L1.

After processing in the beam filter measurement (e.g., beam-specific measurement), a measurement is provided to beam selection for reporting circuitry at point E. This measurement is used as an input for selecting the X measurements to be reported. In embodiments, the reporting rate may be identical to the reporting rate at point A1. The beam selection for beam reporting circuitry is configured to select the X measurements from the measurements provided at point E. The configuration of this module is provided by the aforementioned RRC signaling or different/separate RRC signaling. The beam measurement information to be included in a measurement report is sent or scheduled for transmission on the radio interface at point F.

L1 filtering introduces a certain level of measurement averaging. Exactly how and when the UE performs the required measurements is implementation specific to the point that the output at B fulfils the predefined performance requirements. L3 filtering for cell quality and related parameters do not introduce any delay in the sample availability between B and C. Measurement at point C, C1 is the input used in the event evaluation. L3 Beam filtering and related parameters do not introduce any delay in the sample availability between E and F The measurement reports include a measurement identity of an associated measurement configuration that triggered the reporting; cell and beam measurement quantities to be included in measurement reports are configured by the network (e.g., using RRC signaling); the number of non-serving cells to be reported can be limited through configuration by the network; cells belonging to a blacklist configured by the network are not used in event evaluation and reporting, and conversely when a whitelist is configured by the network, only the cells belonging to the whitelist are used in event evaluation and reporting (by contrast), when a whitelist is configured by the network, only the cells belonging to the whitelist are used in event evaluation and reporting; and beam measurements to be included in measurement reports are configured by the network (beam identifier only, measurement result and beam identifier, or no beam reporting).

Intra-frequency neighbor (cell) measurements include SSB based intra-frequency measurement(s) and CSI-RS based intra-frequency measurements. SSB based intra-frequency measurements is/are defined as an SSB based intra-frequency measurement provided the center frequency of the SSB of the serving cell and the center frequency of the SSB of the neighbour cell are the same, and the subcarrier spacing of the two SSBs is also the same. CSI-RS based intra-frequency measurements is/are defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same.

Inter-frequency neighbor (cell) measurements include SSB based inter-frequency measurement(s) and CSI-RS based inter-frequency measurements. SSB based inter-frequency measurements is/are defined as an SSB based inter-frequency measurement provided the center frequency of the SSB of the serving cell and the center frequency of the SSB of the neighbour cell are different, or the subcarrier spacing of the two SSBs is different. For SSB based measurements, one measurement object corresponds to one SSB and the UE considers different SSBs as different cells. CSI-RS based inter-frequency measurements is/are measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different.

Whether a measurement is non-gap-assisted or gap-assisted depends on the capability of the UE, the active BWP of the UE and the current operating frequency. In non-gap-assisted scenarios, the UE is to carry out such measurements without measurement gaps. In gap-assisted scenarios, the UE cannot be assumed to be able to carry out such measurements without measurement gaps.

Candidate TCI Ranking and Selection for PDSCH

Recall that once the X beams or TCI-States have been identified by the RRC layer, the MAC layer selects a set of preconfigured TCI-states from this set of X TCI-States. In the example illustrated in FIG. 1, there are 8 TCI-states in the set of preconfigured TCI-states. The preconfigured TCI-states are indexed or mapped to a TCI ranging from 1-8. When a TCI-State or beam is selected by the PHY layer, the beam is identified by one of the TCIs 0-7 which in turn is mapped to the appropriate TCI-State referred to by the TCI. For example, the TCI-State selected by the PHY layer is identified as TCI 4, which is mapped to TCI-State 6 in the top set of pre-configured TCI-States. A MAC control element (CE) may occasionally reconfigure the set of preconfigured TCI-States as illustrated in FIG. 1. It can be seen that TCI 4 is mapped to TCI-State 8 after this reconfiguration.

During downlink communication, the gNB may transmit a scheduling PDCCH that provides control information (e.g., bandwidth, modulation order, and so on) for a scheduled PDSCH that will be transmitted some number of slots after transmission of the PDCCH. The difference in time between the transmission of a scheduling PDCCH and the scheduled PDSCH is referred to herein as the "scheduling offset", which is indicated in the PDCCH. As described above, the PDCCH may have DCI present that indicates a TCI to be used in receiving the scheduled PDSCH. For example, as shown in FIG. 1, the PDCCH DCI may indicate TCI 5. In this case, the PHY layer should use the TCI-State mapped to TCI 5 to receive the scheduled PDSCH.

There may be multiple sets of preconfigured TCI-States, including a control resource set (CORESET) that may be used as a default set of TCIs for use when another TCI has not been specified for a given signal. For a CORESET, a UE can be configured with a CORESET of TCI-States by RRC signaling and one of these preconfigured TCI-States can be selected by the MAC CE in the absence of another indicated TCI-State. For example, when a PDCCH does not include DCI that indicates a TCI for the scheduled PDSCH, a "default" TCI selected from the CORESET may be used to receive the PDSCH.

Figure 2:
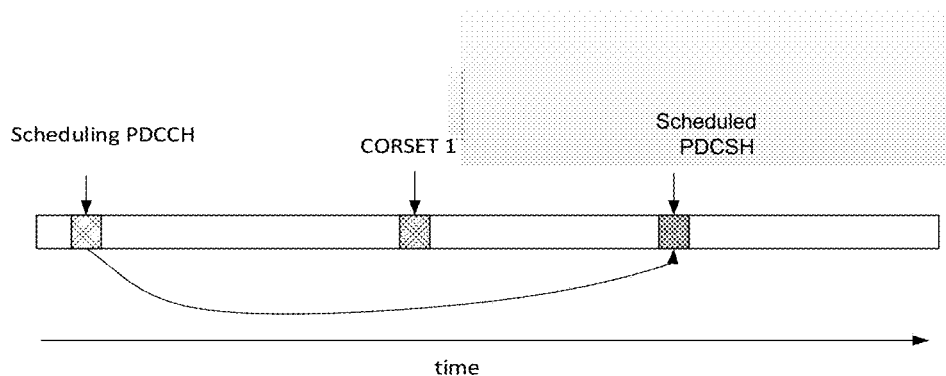
FIG. 2 depicts an exemplary framework for PDSCH QCL assumption.

FIG. 2 illustrates the current framework for a UE selection of a TCI-State for a scheduled PDSCH when QCL type-D is configured in a given TCI-State. When the scheduling offset is below or equal to a threshold the UE reported, the UE could select a TCI-State associated with a particular CORESET of a TCI-State configured in the latest slot with the lowest CORESET-ID if multiple CORESETs are configured. Otherwise, the UE could select a TCI-State indicated by a TCI in the PDSCH or a TCI indicated by DCI, if present, in the scheduling PDCCH.

An additional downlink reference signal, such as a CSI-RS or SSB, may be multiplexed with the PDSCH for one symbol/slot. In this case the UE may select a TCI-State associated with the scheduled PDSCH or a TCI-State indicated by the other signal. However, due to short time between the scheduling PDCCH and the scheduled PDSCH, it is not clear whether the PDSCH will be transmitted in that slot. In other words, when multiple signals are multiplexed with a PDSCH, the UE may have multiple candidate TCIs for use in receiving the PDSCH. How to prioritize these multiple candidate TCIs (taking into account the scheduling offset) to select a TCI the PDSCH in the presence of multiplexed signals for each downlink symbol/slot could be one issue.

Figure 3:
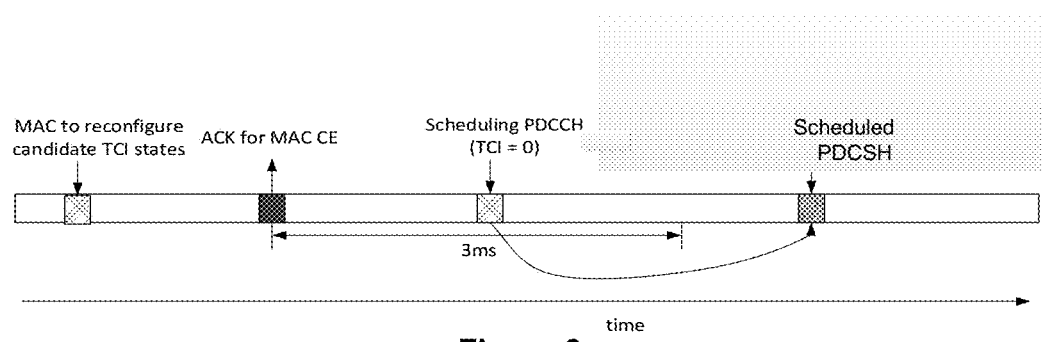
FIG. 3 depicts an exemplary UE QCL assumption during MAC CE reconfiguration of candidate TCI states.

Further, when the gNB down-selects a new set of pre-configured TCI-States from the X RRC configured TCI-States using the MAC CE, there is a latency (e.g., 4 ms) for the UE to apply the new configuration. If the time to apply the new configured TCI-State happens to be in the middle of the scheduling offset, as shown in FIG. 3, the UE assumption for the TCI-State becomes an issue. For example, referring back to FIG. 1, it is unclear whether the TCI-State 6 (as configured when the PDCCH was transmitted) or the TCI-State 8 (as configured when the PDSCH is transmitted) should be mapped to the TCI 4 that is selected by the PHY layer.

Apparatus, methods, and systems described herein provide UE downlink access point (AP) TCI-State selection. Apparatus, methods, and systems described herein include TCI-State selection when multiplexing with other signals with regard to scheduling offset also and TCI-State selection during MAC CE reconfiguration of preconfigured TCI-States.

When the scheduling offset is below or equal to a threshold, the UE can use a default beam to buffer the downlink signal, as it cannot decode DCI immediately. In one example the threshold, which is reported by the UE, is determined based on the UE's processing delay for PDCCH decoding as well as UE beam switching. For the purposes of this description when the scheduling offset is below the threshold, the PDSCH is categorized as a "possible transmitted PDSCH". When the scheduling offset is above the threshold it can be assumed that a UE can have enough time to decode the PDCCH so that it can make sure the PDSCH would really happen with indicated TCI-State. For the purposes of this description when the scheduling offset is above threshold the PDSCH is categorized as an "actually transmitted PDSCH".

Figure 4A:
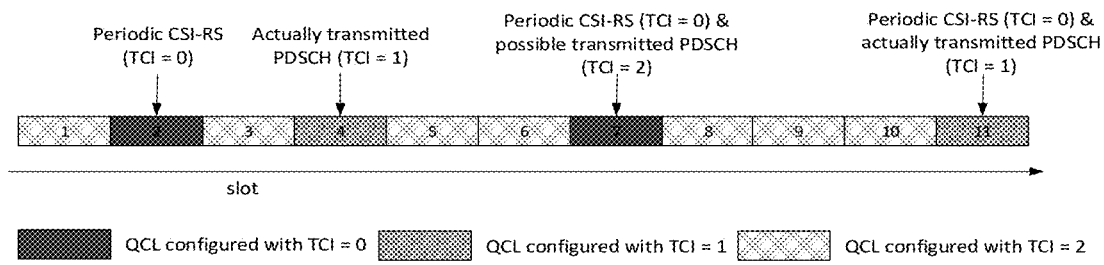
FIG. 4A depicts an exemplary UE AP QCL assumption in accordance with some embodiments.

Referring to FIG. 4A, in one example, a candidate TCI associated with a possible transmitted PDSCH is assigned the lowest priority when the possible transmitted PDSCH is multiplexed with other downlink reference signals. Examples of downlink reference signals include periodic CSI-RS, aperiodic CSI-RS, PDCCH or a channel in Frequency Division Multiplexing (FDM) manner in one component carrier (CC) or different CCs. The lowest priority indicates that the UE may not receive the possible transmitted PDSCH and as such may use a TCI associated with another reference signal/physical channel multiplexed in the same symbol/slot to receive the possible transmitted PDSCH.

In another example, also illustrated in FIG. 4A, a TCI associated with an actually transmitted PDSCH is assigned a higher priority than some downlink reference signals, such as periodic CSI-RS. The UE may use the TCI associated with the actually transmitted PDSCH to receive signals in that slot. Hence, the priority for a candidate TCI associated with an actually transmitted PDSCH is assigned a higher priority than a candidate TCI associated with a possible transmitted PDSCH.

In another example, a candidate TCI associated with a PDSCH scheduled by a PDCCH that is scrambled by different types of radio network temporary identities (RNTI) would have different priority. In one example, a candidate TCI associated with a PDSCH scheduled by a system information RNTI (SI-RNTI) or paging RNTI (P-RNTI) could have a higher priority than a candidate TCI associated with a PDSCH scheduled by a cell RNTI (C-RNTI). In another example, a ranking of candidate TCI priority could be as follows. A candidate TCI associated with a PDSCH scheduled by a PDCCH with SI-RNTI or P-RNTI has a higher priority that a candidate TCI associated with an aperiodic CSI-RS signal. A candidate TCI associated with an aperiodic CSI-RS signal has a higher priority than a candidate TCI associated with an actually transmitted PDSCH. A candidate TCI associated with an actually transmitted PDSCH has a higher priority than a candidate TCI associated with a periodic CSI-RS and/or SSB. A candidate TCI associated with a periodic CSI-RS and/or SSB has a higher priority than a candidate TCI associated with possible transmitted PDSCH.

In another example, the priority rules for ranking candidate TCIs described above may also be applied to the case when some downlink channel or signals which are multiplexed in a time-division multiplexing (TDM) manner for some subcarrier spacing, e.g. downlink signals in consecutive symbols when subcarrier spacing is 120 kHz, or in partial FDM manner, e.g. a different subcarrier spacing is applied.

Figure 4B:
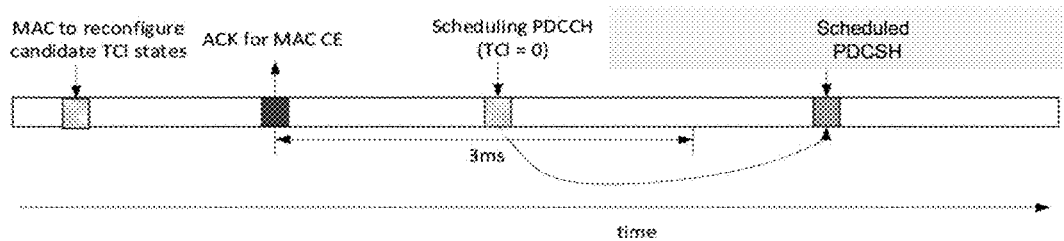
FIG. 4B depicts an exemplary for UE AP QCL assumption during MAC CE reconfiguration in accordance with some embodiments.

FIG. 4B illustrates one an example in which a scheduling PDCCH includes DCI specifying TCI 0 for a scheduled PDSCH. A MAC CE reconfiguration of the preconfigured TCI-State is acknowledged prior to the transmission of the scheduling PDCCH. However, the expiration of the period allowed for the UE to apply the new preconfigured after the scheduling PDCCH is transmitted but prior to when the scheduled PDSCH is transmitted. When the scheduling offset is above the threshold, the TCI-State for PDSCH may be based on a TCI-State mapped to the TCI (e.g., TCI 0) as defined when the scheduling PDCCH is transmitted. Alternatively, when the scheduling offset is above the threshold, the TCI-State for PDSCH may be based on a TCI-State mapped to the TCI (e.g., TCI 0) as defined when the scheduled PDSCH is transmitted.

A similar ambiguity occurs during MAC CE reconfiguration of TCI-States for CORESET for the scheduling PDCCH and DCI indicating a TCI for the scheduled PDSCH is not present in the PDCCH. When the scheduling offset is greater than the threshold the TCI-State for PDSCH may be based on a TCI-State mapped to the CORESET TCI associated with the PDCCH as defined prior to the MAC CE reconfiguration. Alternatively, when the scheduling offset is greater than the threshold the TCI-State for PDSCH may be based on a TCI-State mapped to the CORESET TCI associated with the PDCCH as defined after the MAC CE reconfiguration.

For multi-slot PDSCH transmission, when a TCI is present in DCI of the scheduling PDCCH and the scheduling offset is above the threshold, the TCI-State for the multi-slot PDSCH may be based on the TCI-State mapped to the indicated TCI when the scheduling PDCCH is transmitted. Alternatively, when a TCI is present in DCI of the scheduling PDCCH and the scheduling offset is above the threshold, the TCI-State for the multi-slot PDSCH may be based on the TCI-State mapped to the indicated TCI in a set of preconfigured TCI-States associated with a starting slot of the scheduled PDSCH. Alternatively, when a TCI is present in DCI of the scheduling PDCCH and the scheduling offset is above the threshold, the TCI-State for the multi-slot PDSCH may be based on respective TCI-States mapped to the indicated TCI in respective sets of preconfigured TCI-States associated with each respective slot of the scheduled PDSCH.

Alternatively, the UE shall not expect to receive MAC CE based candidate TCI-State reconfiguration within N slots, where N can be predefined per subcarrier spacing or across subcarrier spacing, e.g. it can be determined by maximum number of slots for multi-slot PDSCH transmission, and/or maximum scheduling offset. In other words, in one example, the gNB is configured to transmit a PDSCH during a plurality of at most N (N>1) downlink slots. In each slot, the PDSCH is transmitted according to a TCI that identifies a unique TCI-State in the set of preconfigured TCI-States associated with a downlink slot. The gNB is configured to configure the set of pre-configured TCI-States for at least N slots so that the UE need not deal with a MAC CE reconfiguration during a multi-slot PDSCH. In one example, N is a maximum scheduling offset.

Figure 5:
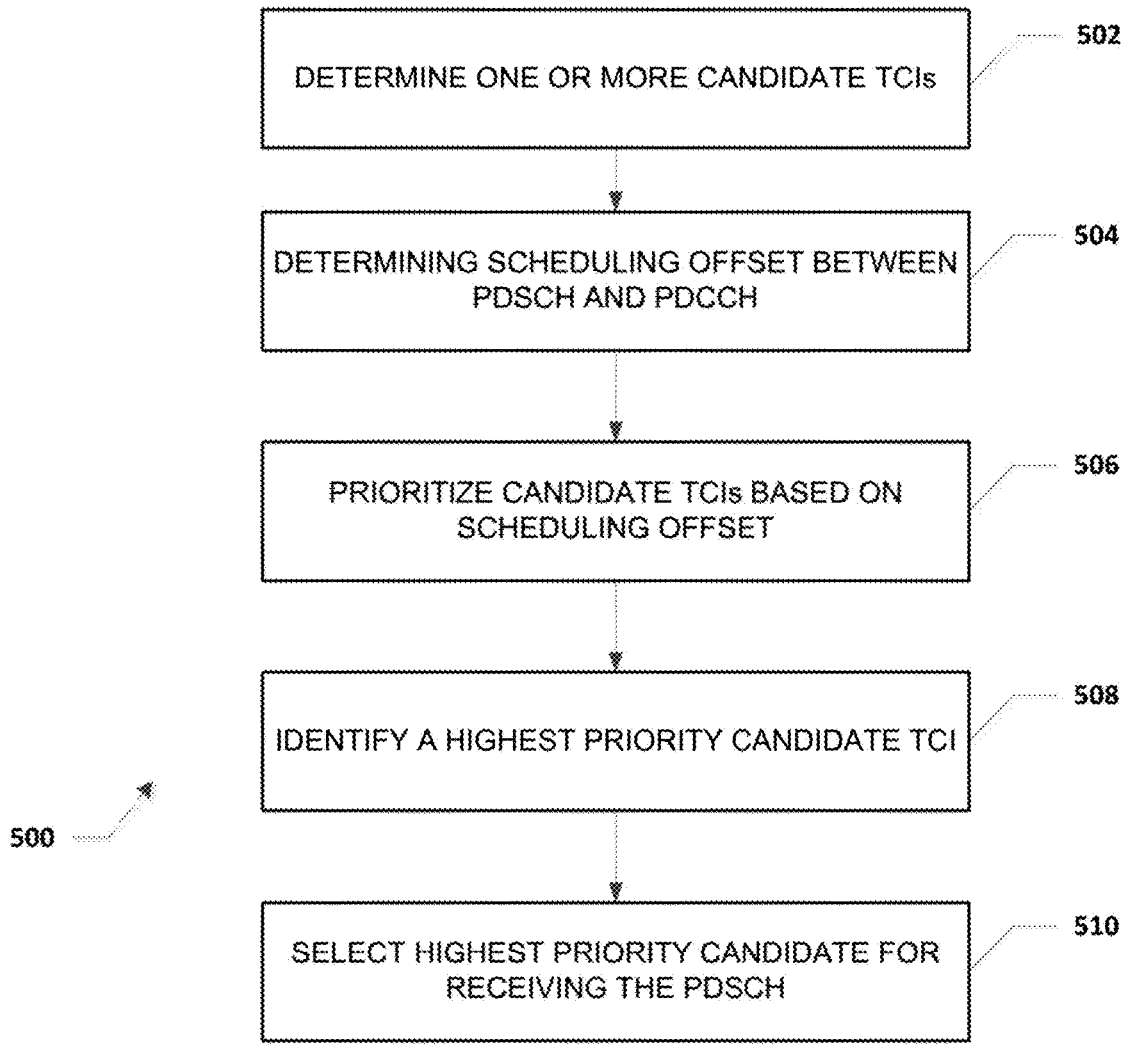
FIG. 5 illustrates a flow diagram of an exemplary method for receiving a downlink signal.

FIG. 5 is a diagram illustrating a process or method 500 for selecting of a TCI based on a scheduling offset by a user equipment (UE) device in accordance with one or more embodiments. The method 500 is provided for illustrative purposes and it is appreciated that suitable variations are contemplated. The UE device can be the UE 601 described below with regard to system 600. The method may be embodied as a set of computer-executable instructions, that when executed, cause the UE to perform the functions outlined in the method 500. The method includes, at 502, determining one or more candidate TCIs for a downlink slot. The method includes, at 504, determining a scheduling offset between a physical downlink shared channel (PDSCH) and a physical downlink control channel (PDCCH). The method includes, at 506, prioritizing the candidate TCIs based on the scheduling offset. The method includes, at 508, identifying a highest priority candidate TCI. The method includes, at 510, selecting the highest priority candidate TCI for receiving the PDSCH. It is appreciated that the above description for FIG. 5 is provided as an example for illustrative purposes and that suitable variations are contemplated.

Figure 6:
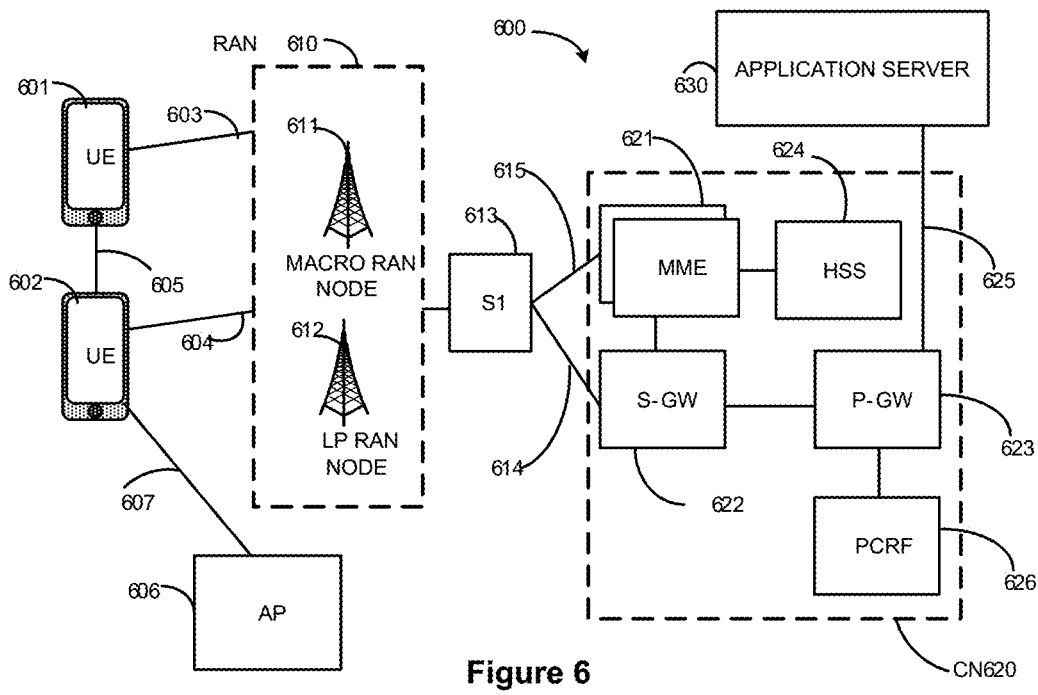
FIG. 6 depicts an exemplary architecture of a system of a network in accordance with some embodiments.

FIG. 6 illustrates an example architecture of a system 600 of a network in accordance with some embodiments. The system 600 is shown to include a user equipment (UE) 601 and a UE 602. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 601 and 602 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections (or channels) 603 and 604, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 605 may be used in vehicular applications and communications technologies, which are often referred to as V2X systems. V2X is a mode of communication where UEs (for example, UEs 601, 602) communicate with each other directly over the PC5/SL interface 605 and can take place when the UEs 601, 602 are served by RAN nodes 611, 612 or when one or more UEs are outside a coverage area of the RAN 610. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 601, 602, RAN nodes 611, 612, application servers 630, and pedestrian UEs 601, 602 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 601, 602 may be implemented/employed as Vehicle Embedded Communications Systems (VECS) or vUEs.

The UE 602 is shown to be configured to access an access point (AP) 606 (also referred to as "WLAN node 606", "WLAN 606", "WLAN Termination 606" or "WT 606" or the like) via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below). In various embodiments, the UE 602, RAN 610, and AP 606 may be configured to utilize LTE-WLAN aggregation (LWA) operation and/or WLAN LTE/WLAN Radio Level Integration with IPsec Tunnel (LWIP) operation. The LWA operation may involve the UE 602 in RRC_CONNECTED being configured by a RAN node 611, 612 to utilize radio resources of LTE and WLAN. LWIP operation may involve the UE 602 using WLAN radio resources (e.g., connection 607) via Internet Protocol Security (IPsec) protocol tunneling to authenticate and encrypt packets (e.g., internet protocol (IP) packets) sent over the connection 607. IPsec tunneling may include encapsulating entirety of original IP packets and adding a new packet header, thereby protecting the original header of the IP packets.

The RAN 610 can include one or more access nodes that enable the connections 603 and 604. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620 via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 620 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7A:
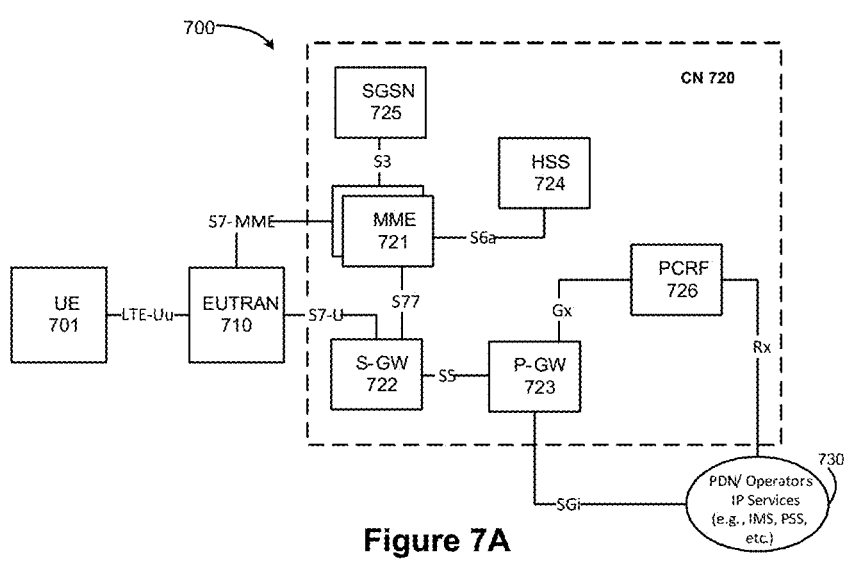
FIG. 7A depicts an exemplary architecture of a system including a first core network in accordance with some embodiments.

FIG. 7A illustrates an example architecture of a system 700 including a first CN 720, in accordance with various embodiments. In this example, system 700 may implement the LTE standard wherein the CN 720 is an EPC 720 that corresponds with CN 620 of FIG. 6. Additionally, the UE 701 may be the same or similar as the UEs 601 of FIG. 6, and the E-UTRAN 710 may be a RAN that is the same or similar to the RAN 610 of FIG. 6, and which may include RAN nodes 611 discussed previously. The CN 720 may comprise MMEs 721, an S-GW 722, a P-GW 723, a HSS 724, and a SGSN 725.

The MMEs 721 may be similar in function to the control plane of legacy SGSN, and may implement MM functions to keep track of the current location of a UE 701. The MMEs 721 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 701, provide user identity confidentiality, and/or perform other like services to users/subscribers. Each UE 701 and the MME 721 may include an MM or EMM sublayer, and an MM context may be established in the UE 701 and the MME 721 when an attach procedure is successfully completed. The MM context may be a data structure or database object that stores MM-related information of the UE 701. The MMEs 721 may be coupled with the HSS 724 via an S6a reference point, coupled with the SGSN 725 via an S3 reference point, and coupled with the S-GW 722 via an S11 reference point.

The SGSN 725 may be a node that serves the UE 701 by tracking the location of an individual UE 701 and performing security functions. In addition, the SGSN 725 may perform Inter-EPC node signaling for mobility between 2G/3G and E-UTRAN 4GPP access networks; PDN and S-GW selection as specified by the MMEs 721; handling of UE 701 time zone functions as specified by the MMEs 721; and MME selection for handovers to E-UTRAN 4GPP access network. The S3 reference point between the MMEs 721 and the SGSN 725 may enable user and bearer information exchange for inter-3GPP access network mobility in idle and/or active states.

The HSS 724 may comprise a database for network users, including subscription-related information to support the network entities' handling of communication sessions. The EPC 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc. An S6a reference point between the HSS 724 and the MMEs 721 may enable transfer of subscription and authentication data for authenticating/authorizing user access to the EPC 720 between HSS 724 and the MMEs 721.

The S-GW 722 may terminate the S1 interface 613 ("S1-U" in FIG. 7A) toward the RAN 710, and routes data packets between the RAN 710 and the EPC 720. In addition, the S-GW 722 may be a local mobility anchor point for inter-RAN node handovers and also may provide an anchor for inter-3GPP mobility. Other responsibilities may include lawful intercept, charging, and some policy enforcement. The S11 reference point between the S-GW 722 and the MMEs 721 may provide a control plane between the MMEs 721 and the S-GW 722. The S-GW 722 may be coupled with the P-GW 723 via an S5 reference point.

The P-GW 723 may terminate an SGi interface toward a PDN 730. The P-GW 723 may route data packets between the EPC 720 and external networks such as a network including the application server 630 (alternatively referred to as an "AF") via an IP interface 625 (see e.g., FIG. 6). In embodiments, the P-GW 723 may be communicatively coupled to an application server (application server 630 of FIG. 6 or PDN 730 in FIG. 7A) via an IP communications interface 625 (see, e.g., FIG. 6). The S5 reference point between the P-GW 723 and the S-GW 722 may provide user plane tunneling and tunnel management between the P-GW 723 and the S-GW 722. The S5 reference point may also be used for S-GW 722 relocation due to UE 701 mobility and if the S-GW 722 needs to connect to a non-collocated P-GW 723 for the required PDN connectivity. The P-GW 723 may further include a node for policy enforcement and charging data collection (e.g., PCEF (not shown)). Additionally, the SGi reference point between the P-GW 723 and the packet data network (PDN) 730 may be an operator external public, a private PDN, or an intra operator packet data network, for example, for provision of IMS services. The P-GW 723 may be coupled with a PCRF 726 via a Gx reference point.

PCRF 726 is the policy and charging control element of the EPC 720. In a non-roaming scenario, there may be a single PCRF 726 in the Home Public Land Mobile Network (HPLMN) associated with a UE 701's Internet Protocol Connectivity Access Network (IP-CAN) session. In a roaming scenario with local breakout of traffic, there may be two PCRFs associated with a UE 701's IP-CAN session, a Home PCRF (H-PCRF) within an HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate QoS and charging parameters. The PCRF 726 may provision this rule into a PCEF (not shown) with the appropriate TFT and QCI, which commences the QoS and charging as specified by the application server 730. The Gx reference point between the PCRF 726 and the P-GW 723 may allow for the transfer of QoS policy and charging rules from the PCRF 726 to PCEF in the P-GW 723. An Rx reference point may reside between the PDN 730 (or "AF 730") and the PCRF 726.

Figure 7B:
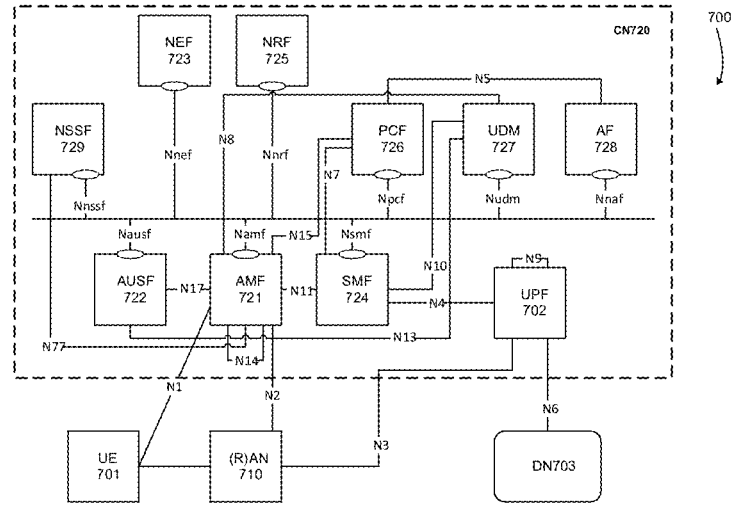
FIG. 7B depicts an exemplary architecture of a system including a second core network in accordance with some embodiments.

FIG. 7B illustrates an architecture of a system 700 including a second CN 720 in accordance with various embodiments. The system 700 is shown to include a UE 701, which may be the same or similar to the UEs 601 and UE 701 discussed previously; a (R)AN 710, which may be the same or similar to the RAN 610 and RAN 710 discussed previously, and which may include RAN nodes 611 discussed previously; and a DN 7203, which may be, for example, operator services, Internet access or 3rd party services; and a 5GC 720. The 5GC 720 may include an AUSF 722; an AMF 721; a SMF 724; a NEF 723; a PCF 726; a NRF 725; a UDM 727; an AF 728; a UPF 702; and a NSSF 729.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 702 may include an uplink classifier to support routing traffic flows to a data network. The DN 703 may represent various network operator services, Internet access, or third party services. DN 703 may include, or be similar to, application server 630 discussed previously. The UPF 702 may interact with the SMF 724 via an N4 reference point between the SMF 724 and the UPF 702.

The AUSF 722 may store data for authentication of UE 701 and handle authentication-related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 may be responsible for registration management (e.g., for registering UE 701, etc.), connection management, reachability management, mobility management, and lawful interception of AMF-related events, and access authentication and authorization. The AMF 721 may be a termination point for the an N11 reference point between the AMF 721 and the SMF 724. The AMF 721 may provide transport for SM messages between the UE 701 and the SMF 724, and act as a transparent proxy for routing SM messages. AMF 721 may also provide transport for SMS messages between UE 701 and an SMSF (not shown by FIG. 7B). AMF 721 may act as SEAF, which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a SCM function, which receives a key from the SEA that it uses to derive access-network specific keys. Furthermore, AMF 721 may be a termination point of a RAN CP interface, which may include or be an N2 reference point between the (R)AN 710 and the AMF 721; and the AMF 721 may be a termination point of NAS (N1) signalling, and perform NAS ciphering and integrity protection.

AMF 721 may also support NAS signalling with a UE 701 over an N3 IWF interface. The N3IWF may be used to provide access to untrusted entities. N3IWF may be a termination point for the N2 interface between the (R)AN 710 and the AMF 721 for the control plane, and may be a termination point for the N3 reference point between the (R)AN 710 and the UPF 702 for the user plane. As such, the AMF 721 may handle N2 signalling from the SMF 724 and the AMF 721 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-EIR (not shown by FIG. 7B).

The UE 701 may need to register with the AMF 721 in order to receive network services. RM is used to register or deregister the UE 701 with the network (e.g., AMF 721), and establish a UE context in the network (e.g., AMF 721). The UE 701 may operate in an RM-REGISTERED state or an RM-DEREGISTERED state. In the RM-DEREGISTERED state, the UE 701 is not registered with the network, and the UE context in AMF 721 holds no valid location or routing information for the UE 701 so the UE 701 is not reachable by the AMF 721. In the RM-REGISTERED state, the UE 701 is registered with the network, and the UE context in AMF 721 may hold a valid location or routing information for the UE 701 so the UE 701 is reachable by the AMF 721. In the RM-REGISTERED state, the UE 701 may perform mobility Registration Update procedures, perform periodic Registration Update procedures triggered by expiration of the periodic update timer (e.g., to notify the network that the UE 701 is still active), and perform a Registration Update procedure to update UE capability information or to renegotiate protocol parameters with the network, among others.

The AMF 721 may store one or more RM contexts for the UE 701, where each RM context is associated with a specific access to the network. The RM context may be a data structure, database object, etc. that indicates or stores, inter alia, a registration state per access type and the periodic update timer. The AMF 721 may also store a 5GC MM context that may be the same or similar to the (E)MM context discussed previously. In various embodiments, the AMF 721 may store a CE mode B Restriction parameter of the UE 701 in an associated MM context or RM context. The AMF 721 may also derive the value, when needed, from the UE's usage setting parameter already stored in the UE context (and/or MM/RM context).

CM may be used to establish and release a signaling connection between the UE 701 and the AMF 721 over the N1 interface. The signaling connection is used to enable NAS signaling exchange between the UE 701 and the CN 720, and comprises both the signaling connection between the UE and the AN (e.g., RRC connection or UE-N3IWF connection for non-3GPP access) and the N2 connection for the UE 701 between the AN (e.g., RAN 710) and the AMF 721. The UE 701 may operate in one of two CM states, CM-IDLE mode or CM-CONNECTED mode. When the UE 701 is operating in the CM-IDLE state/mode, the UE 701 may have no NAS signaling connection established with the AMF 721 over the N1 interface, and there may be (R)AN 710 signaling connection (e.g., N2 and/or N3 connections) for the UE 701. When the UE 701 is operating in the CM-CONNECTED state/mode, the UE 701 may have an established NAS signaling connection with the AMF 721 over the N1 interface, and there may be a (R)AN 710 signaling connection (e.g., N2 and/or N3 connections) for the UE 701. Establishment of an N2 connection between the (R)AN 710 and the AMF 721 may cause the UE 701 to transition from CM-IDLE mode to CM-CONNECTED mode, and the UE 701 may transition from the CM-CONNECTED mode to the CM-IDLE mode when N2 signaling between the (R)AN 710 and the AMF 721 is released.

The SMF 724 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 701 and a data network (DN) 703 identified by a Data Network Name (DNN). PDU sessions may be established upon UE 701 request, modified upon UE 701 and 5GC 720 request, and released upon UE 701 and 5GC 720 request using NAS SM signaling exchanged over the N1 reference point between the UE 701 and the SMF 724. Upon request from an application server, the 5GC 720 may trigger a specific application in the UE 701. In response to receipt of the trigger message, the UE 701 may pass the trigger message (or relevant parts/information of the trigger message) to one or more identified applications in the UE 701.

The identified application(s) in the UE 701 may establish a PDU session to a specific DNN. The SMF 724 may check whether the UE 701 requests are compliant with user subscription information associated with the UE 701. In this regard, the SMF 724 may retrieve and/or request to receive update notifications on SMF 724 level subscription data from the UDM 727.

The SMF 724 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 4GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF discovery requests from NF instances, and provide the information of the discovered NF instances to the NF instances. NRF 725 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behaviour. The PCF 726 may also implement an FE to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF. The UDM 727 may include two parts, an application FE and a UDR (the FE and UDR are not shown by FIG. 7B). The UDR may store subscription data and policy data for the UDM 727 and the PCF 726, and/or structured data for exposure and application data (including PFDs for application detection, application request information for multiple UEs 701) for the NEF 723. The Nudr service-based interface may be exhibited by the UDR 221 to allow the UDM 727, PCF 726, and NEF 723 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, provide access to the NCE, and interact with the policy framework for policy control. The NCE may be a mechanism that allows the 5GC 720 and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed NSSAI and the mapping to the subscribed S-NSSAIs, if needed. The NSSF 729 may also determine the AMF set to be used to serve the UE 701, or a list of candidate AMF(s) 721 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7B). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for a notification procedure that the UE 701 is available for SMS transfer (e.g., set a UE not reachable flag, and notifying UDM 727 when UE 701 is available for SMS).

The CN 120 may also include other elements that are not shown by FIG. 7, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 7B). Individual NFs may share a UDSF for storing their respective unstructured data or individual NFs may each have their own UDSF located at or near the individual NFs. Additionally, the UDSF may exhibit an Nudsf service-based interface (not shown by FIG. 7B). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7B for clarity. In one example, the CN 720 may include an Nx interface, which is an inter-CN interface between the MME (e.g., MME 71) and the AMF 721 in order to enable interworking between CN 720 and CN 70. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 8A:
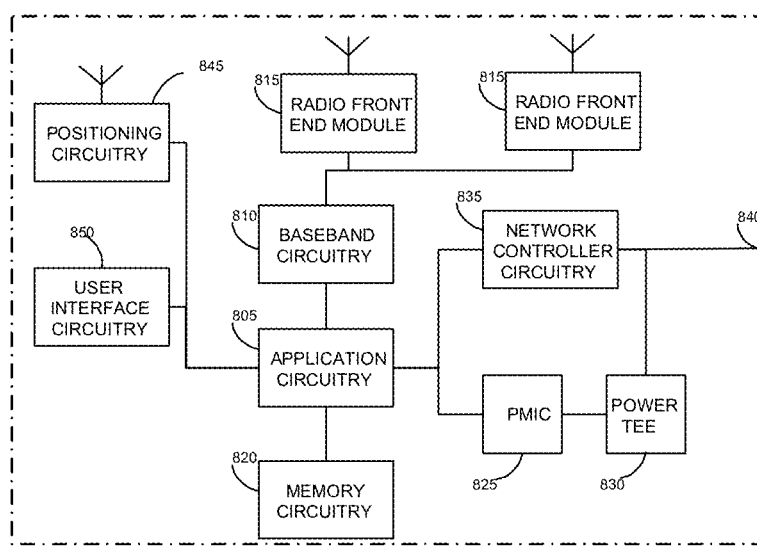
FIG. 8A depicts exemplary infrastructure equipment in accordance with various embodiments.

FIG. 8A illustrates an example of infrastructure equipment 800 in accordance with various embodiments. The infrastructure equipment 800 (or "system 800") may be implemented as a base station, radio head, RAN node, etc., such as the RAN nodes 611 and/or AP 606 shown and described previously. In other examples, the system 800 could be implemented in or by a UE, application server(s) 630, and/or any other element/device discussed herein. The system 800 may include one or more of application circuitry 805, baseband circuitry 810, one or more radio front end modules 815, memory circuitry 820, power management integrated circuitry (PMIC) 825, power tee circuitry 830, network controller circuitry 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 620 (or CN 720 discussed supra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, RAN device, gateway, server, virtualized VNF, NFVI, and/or the like.

Application circuitry 805 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 800 may not utilize application circuitry 805, and instead may include a special-purpose processor/controller to process IP data received from an EPC or SGC, for example.

Additionally or alternatively, application circuitry 805 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 may comprise various hardware elements (e.g., including hardware devices such as switches, filters, amplifiers, antenna elements, and the like to facilitate OTA communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 845 and/or positioning circuitry implemented by UEs 601, 602, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 845 may include a Micro-Technology for Positioning, Navigation, and Timing (Micro-PNT) integrated circuit (IC) that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 4D position may then be converted into a latitude, longitude and altitude. The positioning circuitry 845 may provide data to application circuitry 805 that may include one or more of position data or time data. Application circuitry 805 may use the time data to synchronize operations with other radio base stations (e.g., RAN nodes 611 or the like).

The components shown by FIG. 8A may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 8B:
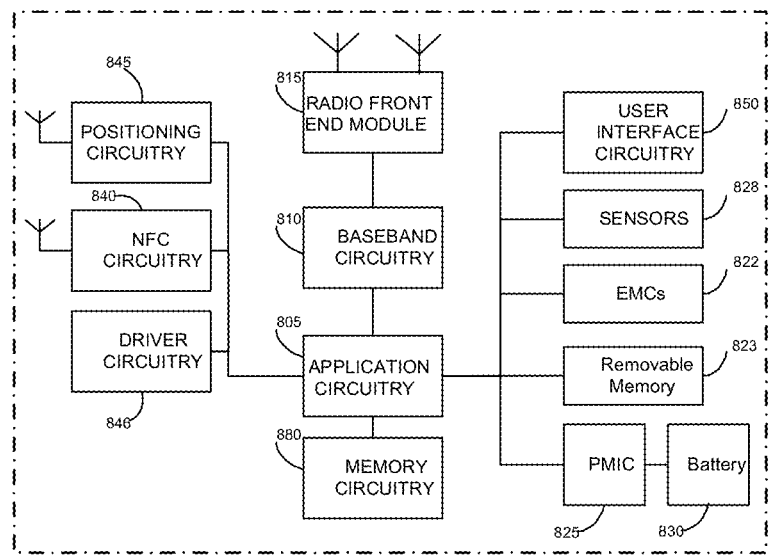
FIG. 8B depicts exemplary components of a computer platform in accordance with various embodiments

FIG. 8B illustrates an alternative example of a platform 800' (or "device 800'") in accordance with various embodiments. In embodiments, the computer platform 800' may be suitable for use as UEs 601, 602, 701, application servers 630, and/or any other element/device discussed herein. The platform 800' may include any combinations of the components shown in the example. The components of platform 800' may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8B is intended to show a high level view of components of the computer platform 800'. However, some of the components shown may be omitted, additional components may be present, and different arrangement of the components shown may occur in other implementations.

The application circuitry 805 may include circuitry such as, but not limited to, single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input/output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 800. In some embodiments, processors of application circuitry 805 may process IP data packets received from an EPC or 5GC.

Application circuitry 805 may be or include a microprocessor, a multi-core processor, a multithreaded processor, an ultra-low voltage processor, an embedded processor, or other known processing element. In one example, the application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry may include sensors 821, such as accelerometers, level sensors, flow sensors, temperature sensors, pressure sensors, barometric pressure sensors, and the like. The interface circuitry may be used to connect the platform 800 to electro-mechanical components (EMCs) 822, which may allow platform 800 to change its state, position, and/or orientation, or move or control a mechanism or system. The EMCs 822 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 may be configured to operate one or more EMCs 822 based on one or more captured events and/or instructions or control signals received from a service provider and/or various clients.

In some implementations, the interface circuitry may connect the platform 800 with positioning circuitry 845, which may be the same or similar as the positioning circuitry 8145 discussed with regard to FIG. 8A.

In some implementations, the interface circuitry may connect the platform 800 with Near-Field Communication (NFC) circuitry 840, which may include an NFC controller coupled with an antenna element and a processing device. The NFC circuitry 840 may be configured to read electronic tags and/or connect with another NFC-enabled device.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensors 821 and control and allow access to sensors 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800' is capable of being powered by a battery 830, for example, when the device is included in a UE 601, 602, 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block 830 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chyrstal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc Although not shown, the components of platform 800 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, a FlexRay system, or any number of other technologies. The bus may be a proprietary bus, for example, used in a SoC based system. Other bus systems may be included, such as an I2C interface, an SPI interface, point-to-point interfaces, and a power bus, among others.

Figure 9:
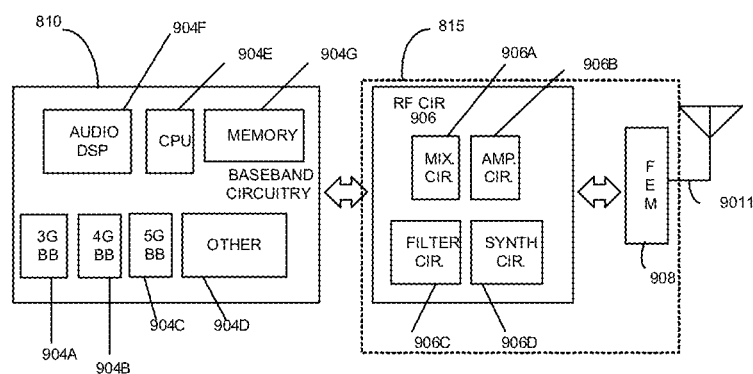
FIG. 9 depicts exemplary components of baseband circuitry and radio frequency circuitry in accordance with various embodiments.

FIG. 9 illustrates example components of baseband circuitry 810 and radio front end modules (RFEM) 815 in accordance with various embodiments. As shown, the RFEMs 815 may include Radio Frequency (RF) circuitry 906, front-end module (FEM) circuitry 908, one or more antennas 911 coupled together at least as shown.

The baseband circuitry 810 may include circuitry such as, but not limited to, one or more single-core or multi-core processors. The baseband circuitry 810 may include one or more baseband processors or control logic to process baseband signals received from a receive signal path of the RF circuitry 906 and to generate baseband signals for a transmit signal path of the RF circuitry 906. Baseband processing circuitry 810 may interface with the application circuitry 805 for generation and processing of the baseband signals and for controlling operations of the RF circuitry 906. For example, in some embodiments, the baseband circuitry 810 may include a third generation (3G) baseband processor 904A, a 5G baseband processor 904B, a 5G baseband processor 904C, or other baseband processor(s) 904D for other existing generations, generations in development or to be developed in the future (e.g., second generation (2G), sixth generation (6G), etc.). The baseband circuitry 810 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 810 may include one or more audio digital signal processor(s) (DSP) 904F. The audio DSP(s) 904F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 810 and the application circuitry 805 may be implemented together such as, for example, on a system on a chip (SOC).

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 810. RF circuitry 906 may also include a transmit signal path, which may include circuitry to up-convert baseband signals provided by the baseband circuitry 810 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 906*a* of the receive signal path may comprise passive mixers, although the scope of the embodiments is not limited in this respect.

In some embodiments, the mixer circuitry 906*a* of the transmit signal path may be configured to up-convert input baseband signals based on the synthesized frequency provided by the synthesizer circuitry 906*d* to generate RF output signals for the FEM circuitry 908. The baseband signals may be provided by the baseband circuitry 810 and may be filtered by filter circuitry 906*c*.

In some embodiments, the mixer circuitry 906*a* of the receive signal path and the mixer circuitry 906*a* of the transmit signal path may include two or more mixers and may be arranged for quadrature downconversion and upconversion, respectively. In some embodiments, the mixer circuitry 906*a* of the receive signal path and the mixer circuitry 906*a* of the transmit signal path may include two or more mixers and may be arranged for image rejection (e.g., Hartley image rejection). In some embodiments, the mixer circuitry 906*a* of the receive signal path and the mixer circuitry 906*a* of the transmit signal path may be arranged for direct downconversion and direct upconversion, respectively. In some embodiments, the mixer circuitry 906*a* of the receive signal path and the mixer circuitry 906*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 810 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906*d* may be a fractional-N synthesizer or a fractional N/N+1 synthesizer, although the scope of the embodiments is not limited in this respect as other types of frequency synthesizers may be suitable. For example, synthesizer circuitry 906*d* may be a delta-sigma synthesizer, a frequency multiplier, or a synthesizer comprising a phase-locked loop with a frequency divider.

The synthesizer circuitry 906*d* may be configured to synthesize an output frequency for use by the mixer circuitry 906*a* of the RF circuitry 906 based on a frequency input and a divider control input. In some embodiments, the synthesizer circuitry 906*d* may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 805 depending on the desired output frequency. In some embodiments, a divider control input (e.g., N) may be determined from a look-up table based on a channel indicated by the application circuitry 805.

Synthesizer circuitry 906*d* of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from one or more antennas 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of the one or more antennas 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 911).

Processors of the application circuitry 805 and processors of the baseband circuitry 810 may be used to execute elements of one or more instances of a protocol stack. For example, processors of the baseband circuitry 810, alone or in combination, may be used execute Layer 4, Layer 2, or Layer 2 functionality, while processors of the application circuitry 805 may utilize data (e.g., packet data) received from these layers and further execute Layer 5 functionality (e.g., TCP and UDP layers). As referred to herein, Layer 4 may comprise a RRC layer, described in further detail below. As referred to herein, Layer 3 may comprise a MAC layer, an RLC layer, and a PDCP layer, described in further detail below. As referred to herein, Layer 2 may comprise a PHY layer of a UE/RAN node, described in further detail below.

Figure 10:
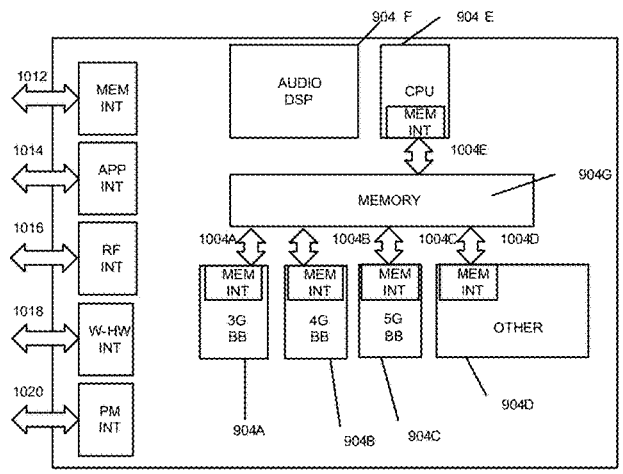
FIG. 10 depicts exemplary interfaces of baseband circuitry in accordance with some embodiments.

FIG. 10 illustrates example interfaces of baseband circuitry in accordance with various embodiments. As discussed above, the baseband circuitry 810 of FIGS. 8A, 8B, and 9 may comprise processors 904A-904E and a memory 904G utilized by said processors. Each of the processors 904A-904E may include a memory interface, 1004A-1004E, respectively, to send/receive data to/from the memory 904G.

The baseband circuitry 810 may further include one or more interfaces to communicatively couple to other circuitries/devices, such as a memory interface 1012 (e.g., an interface to send/receive data to/from memory external to the baseband circuitry 810), an application circuitry interface 1014 (e.g., an interface to send/receive data to/from the application circuitry 805 of FIGS. 8A-9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMIC 825.

Figure 11:
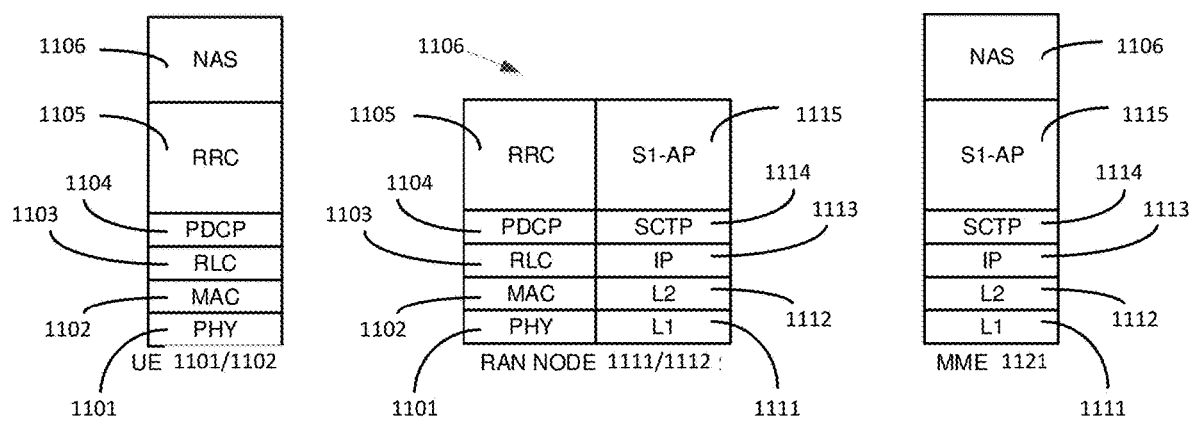
FIG. 11 is an illustration of a example control plane protocol stack in accordance with some embodiments.

FIG. 11 is an illustration of a control plane protocol stack in accordance with some embodiments. In this embodiment, a control plane 1100 is shown as a communications protocol stack between the UE 601 (or alternatively, the UE 602), the RAN node 611 (or alternatively, the RAN node 612), and the MME 621.

The PHY layer 1101 may transmit or receive information used by the MAC layer 1102 over one or more air interfaces. The PHY layer 1101 may further perform link adaptation or adaptive modulation and coding (AMC), power control, cell search (e.g., for initial synchronization and handover purposes), and other measurements used by higher layers, such as the RRC layer 1105. The PHY layer 1101 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1102 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1103 may operate in a plurality of modes of operation, including: Transparent Mode (TM), Unacknowledged Mode (UM), and Acknowledged Mode (AM). The RLC layer 1103 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1103 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1104 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1105 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 601 and the RAN node 611 may utilize a Uu interface (e.g., an LTE-Uu interface) to exchange control plane data via a protocol stack comprising the PHY layer 1101, the MAC layer 1102, the RLC layer 1103, the PDCP layer 1104, and the RRC layer 1105.

The non-access stratum (NAS) protocols 1106 form the highest stratum of the control plane between the UE 601 and the MME 621. The NAS protocols 1106 support the mobility of the UE 601 and the session management procedures to establish and maintain IP connectivity between the UE 601 and the P-GW 623.

The S1 Application Protocol (S1-AP) layer 1115 may support the functions of the S1 interface and comprise Elementary Procedures (EPs). An EP is a unit of interaction between the RAN node 611 and the CN 620. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1114 may ensure reliable delivery of signaling messages between the RAN node 611 and the MME 621 based, in part, on the IP protocol, supported by the IP layer 1113. The L2 layer 1112 and the L1 layer 1111 may refer to communication links (e.g., wired or wireless) used by the RAN node and the MME to exchange information.

The RAN node 611 and the MME 621 may utilize an S1-MME interface to exchange control plane data via a protocol stack comprising the L1 layer 1111, the L2 layer 1112, the IP layer 1113, the SCTP layer 1114, and the S1-AP layer 1115.

Figure 12:
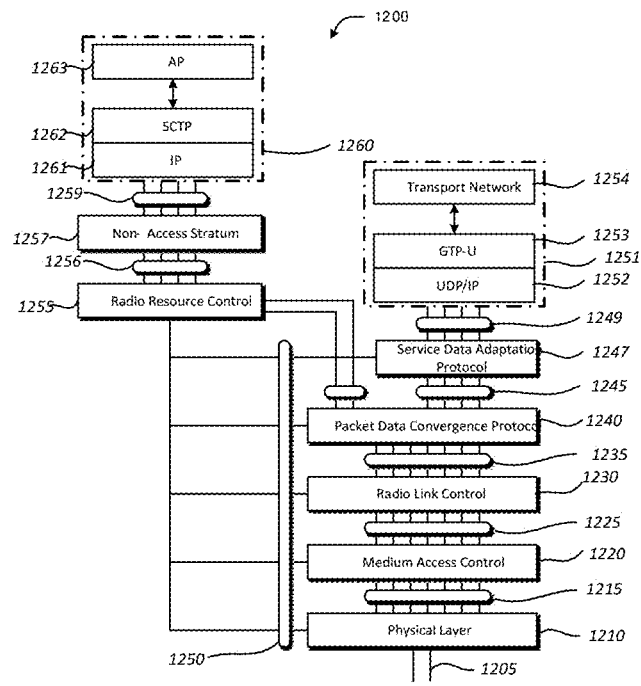
FIG. 12 is an illustration of various exemplary protocol functions that may be used for various protocol stacks in accordance with various embodiments.

FIG. 12 illustrates various protocol functions that may be implemented in a wireless communication device according to various embodiments. In particular, FIG. 12 includes an arrangement 1200 showing interconnections between various protocol layers/entities. The following description of FIG. 12 is provided for various protocol layers/entities that operate in conjunction with the 5G/NR system standards and LTE system standards, but some or all of the aspects of FIG. 12 may be applicable to other wireless communication network systems as well.

The protocol layers of arrangement 1200 may include one or more of PHY 1210, MAC 1220, RLC 1230, PDCP 1240, SDAP 1247, RRC 1255, and NAS layer 1257, in addition to other higher layer functions not illustrated. The protocol layers may include one or more service access points (e.g., items 1259, 1256, 1250, 1249, 1245, 1235, 1225, and 1215 in FIG. 12) that may provide communication between two or more protocol layers.

The PHY 1210 may transmit and receive physical layer signals 1205 that may be received from or transmitted to one or more other communication devices. The physical layer signals 1205 may comprise one or more physical channels, such as those discussed herein. The PHY 1210 may further perform link adaptation or adaptive modulation and coding (AMC), power control, cell search (e.g., for initial synchronization and handover purposes), and other measurements used by higher layers, such as the RRC 1255. The PHY 1210 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1210 may process requests from and provide indications to an instance of MAC 1220 via one or more PHY-SAP 1215. According to some embodiments, requests and indications communicated via PHY-SAP 1215 may comprise one or more transport channels.

Instance(s) of MAC 1220 may process requests from, and provide indications to, an instance of RLC 1230 via one or more MAC-SAPs 1225. These requests and indications communicated via the MAC-SAP 1225 may comprise one or more logical channels. The MAC 1220 may perform mapping between the logical channels and transport channels, multiplexing of MAC SDUs from one or more logical channels onto TBs to be delivered to PHY 1210 via the transport channels, de-multiplexing MAC SDUs to one or more logical channels from TBs delivered from the PHY 1210 via transport channels, multiplexing MAC SDUs onto TBs, scheduling information reporting, error correction through HARQ, and logical channel prioritization.

Instance(s) of RLC 1230 may process requests from and provide indications to an instance of PDCP 1240 via one or more radio link control service access points (RLC-SAP) 1235. These requests and indications communicated via RLC-SAP 1235 may comprise one or more RLC channels. The RLC 1230 may operate in a plurality of modes of operation, including: Transparent Mode™, Unacknowledged Mode (UM), and Acknowledged Mode (AM). The RLC 1230 may execute transfer of upper layer protocol data units (PDUs), error correction through automatic repeat request (ARQ) for AM data transfers, and concatenation, segmentation and reassembly of RLC SDUs for UM and AM data transfers. The RLC 1230 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1240 may process requests from and provide indications to instance(s) of RRC 1255 and/or instance(s) of SDAP 1247 via one or more packet data convergence protocol service access points (PDCP-SAP) 1245. These requests and indications communicated via PDCP-SAP 1245 may comprise one or more radio bearers. The PDCP 1240 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1247 may process requests from and provide indications to one or more higher layer protocol entities via one or more SDAP-SAP 1249. These requests and indications communicated via SDAP-SAP 1249 may comprise one or more QoS flows. The SDAP 1247 may map QoS flows to DRBs, and vice versa, and may also mark QFIs in DL and UL packets. A single SDAP entity 1247 may be configured for an individual PDU session. In the UL direction, the NG-RAN 610 may control the mapping of QoS Flows to DRB(s) in two different ways, reflective mapping or explicit mapping. For reflective mapping, the SDAP 1247 of a UE 601 may monitor the QFIs of the DL packets for each DRB, and may apply the same mapping for packets flowing in the UL direction. For a DRB, the SDAP 1247 of the UE 601 may map the UL packets belonging to the QoS flows(s) corresponding to the QoS flow ID(s) and PDU session observed in the DL packets for that DRB. To enable reflective mapping, the NG-RAN 710 may mark DL packets over the Uu interface with a QoS flow ID. The explicit mapping may involve the RRC 1255 configuring the SDAP 1247 with an explicit QoS flow to DRB mapping rule, which may be stored and followed by the SDAP 1247. In embodiments, the SDAP 1247 may only be used in NR implementations and may not be used in LTE implementations.

The RRC 1255 may configure, via one or more management service access points (M-SAP), aspects of one or more protocol layers, which may include one or more instances of PHY 1210, MAC 1220, RLC 1230, PDCP 1240 and SDAP 1247. In embodiments, an instance of RRC 1255 may process requests from and provide indications to one or more NAS entities 1257 via one or more RRC-SAPs 1256. The main services and functions of the RRC 1255 may include broadcast of system information (e.g., included in MIBs or SIBs related to the NAS), broadcast of system information related to the access stratum (AS), paging, establishment, maintenance and release of an RRC connection between the UE 601 and RAN 610 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1257 may form the highest stratum of the control plane between the UE 601 and the AMF 721. The NAS 1257 may support the mobility of the UEs 601 and the session management procedures to establish and maintain IP connectivity between the UE 601 and a P-GW in LTE systems.

According to various embodiments, one or more protocol entities of arrangement 1200 may be implemented in UEs 601, RAN nodes 611, AMF 721 in NR implementations or MME 71 in LTE implementations, UPF 702 in NR implementations or S-GW 72 and P-GW 73 in LTE implementations, or the like to be used for control plane or user plane communications protocol stack between the aforementioned devices. In such embodiments, one or more protocol entities that may be implemented in one or more of UE 601, gNB 611, AMF 721, etc. may communicate with a respective peer protocol entity that may be implemented in or on another device using the services of respective lower layer protocol entities to perform such communication. In some embodiments, a gNB-CU of the gNB 611 may host the RRC 1255, SDAP 1247, and PDCP 1240 of the gNB that controls the operation of one or more gNB-DUs, and the gNB-DUs of the gNB 611 may each host the RLC 1230, MAC 1220, and PHY 1210 of the gNB 611.

In a first example, a control plane protocol stack may comprise, in order from highest layer to lowest layer, NAS 1257, RRC 1255, PDCP 1240, RLC 1230, MAC 1220, and PHY 1210. In this example, upper layers 1260 may be built on top of the NAS 1257, which includes an IP layer 1261, an SCTP 1262, and an application layer signaling protocol (AP) 1263.

In NR implementations, the AP 1263 may be an NG application protocol layer (NGAP or NG-AP) 1263 for the NG interface 613 defined between the NG-RAN node 611 and the AMF 721, or the AP 1263 may be an Xn application protocol layer (XnAP or Xn-AP) 1263 for the Xn interface 612 that is defined between two or more RAN nodes 611.

The NG-AP 1263 may support the functions of the NG interface 613 and may comprise Elementary Procedures (EPs). An NG-AP EP may be a unit of interaction between the NG-RAN node 611 and the AMF 721. The NG-AP 1263 services may comprise two groups: UE-associated services (e.g., services related to a UE 601, 602) and non-UE-associated services (e.g., services related to the whole NG interface instance between the NG-RAN node 611 and AMF 721). These services may include functions including, but not limited to: a paging function for the sending of paging requests to NG-RAN nodes 611 involved in a particular paging area; a UE context management function for allowing the AMF 721 to establish, modify, and/or release a UE context in the AMF 721 and the NG-RAN node 611; a mobility function for UEs 601 in ECM-CONNECTED mode for intra-system HOs to support mobility within NG-RAN and inter-system HOs to support mobility from/to EPS systems; a NAS Signaling Transport function for transporting or rerouting NAS messages between UE 601 and AMF 721; a NAS node selection function for determining an association between the AMF 721 and the UE 601; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 611 via CN 620; and/or other like functions.

The XnAP 1263 may support the functions of the Xn interface 612 and may comprise XnAP basic mobility procedures and XnAP global procedures. The XnAP basic mobility procedures may comprise procedures used to handle UE mobility within the NG RAN 611 (or E-UTRAN 710), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 601, such as Xn interface setup and reset procedures, NG-RAN update procedures, cell activation procedures, and the like.

In LTE implementations, the AP 1263 may be an S1 Application Protocol layer (S1-AP) 1263 for the S1 interface 613 defined between an E-UTRAN node 611 and an MME, or the AP 1263 may be an X2 application protocol layer (X2AP or X2-AP) 1263 for the X2 interface 612 that is defined between two or more E-UTRAN nodes 611.

The S1 Application Protocol layer (S1-AP) 1263 may support the functions of the S1 interface, and similar to the NG-AP discussed previously, the S1-AP may comprise S1-AP EPs. An S1-AP EP may be a unit of interaction between the E-UTRAN node 611 and an MME 71 within an LTE CN 620. The S1-AP 1263 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1263 may support the functions of the X2 interface 612 and may comprise X2AP basic mobility procedures and X2AP global procedures. The X2AP basic mobility procedures may comprise procedures used to handle UE mobility within the E-UTRAN 620, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 601, such as X2 interface setup and reset procedures, load indication procedures, error indication procedures, cell activation procedures, and the like.

The SCTP layer (alternatively referred to as the SCTP/IP layer) 1262 may provide guaranteed delivery of application layer messages (e.g., NGAP or XnAP messages in NR implementations, or S1-AP or X2AP messages in LTE implementations). The SCTP 1262 may ensure reliable delivery of signaling messages between the RAN node 611 and the MME/AMF 721 based, in part, on the IP protocol, supported by the IP 1261. The Internet Protocol layer (IP) 1261 may be used to perform packet addressing and routing functionality. In some implementations the IP layer 1261 may use point-to-point transmission to deliver and convey PDUs. In this regard, the RAN node 611 may comprise L2 and L1 layer communication links (e.g., wired or wireless) with the MME/AMF to exchange information.

In a second example, a user plane protocol stack may comprise, in order from highest layer to lowest layer, SDAP 1247, PDCP 1240, RLC 1230, MAC 1220, and PHY 1210. The user plane protocol stack may be used for communication between the UE 601, the RAN node 611, and UPF 702 in NR implementations or an S-GW 722 and P-GW 723 in LTE implementations. In this example, upper layers 1251 may be built on top of the SDAP 1247, and may include a user datagram protocol (UDP) and IP security layer (UDP/IP) 1252, a General Packet Radio Service (GPRS) Tunneling Protocol for the user plane layer (GTP-U) 1253, and a User Plane PDU layer (UP PDU) 1263.

The transport network layer 1254 (also referred to as a "transport layer") may be built on IP transport, and the GTP-U 1253 may be used on top of the UDP/IP layer 1252 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1253 may be used for carrying user data within the GPRS core network and between the radio access network and the core network. The user data transported can be packets in any of IPv4, IPv6, or PPP formats, for example. The UDP/IP 1252 may provide checksums for data integrity, port numbers for addressing different functions at the source and destination, and encryption and authentication on the selected data flows. The RAN node 611 and the S-GW 722 may utilize an S1-U interface to exchange user plane data via a protocol stack comprising an L1 layer (e.g., PHY 1210), an L2 layer (e.g., MAC 1220, RLC 1230, PDCP 1240, and/or SDAP 1247), the UDP/IP layer 1252, and the GTP-U 1253. The S-GW 722 and the P-GW 723 may utilize an S5/S8a interface to exchange user plane data via a protocol stack comprising an L1 layer, an L2 layer, the UDP/IP layer 1252, and the GTP-U 1253. As discussed previously, NAS protocols may support the mobility of the UE 601 and the session management procedures to establish and maintain IP connectivity between the UE 601 and the P-GW 723.

Moreover, although not shown by FIG. 12, an application layer may be present above the AP 1263 and/or the transport network layer 1254. The application layer may be a layer in which a user of the UE 601, RAN node 611, or other network element interacts with software applications being executed, for example, by application circuitry 805 or application circuitry 805, respectively. The application layer may also provide one or more interfaces for software applications to interact with communications systems of the UE 601 or RAN node 611, such as the baseband circuitry 810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 13:
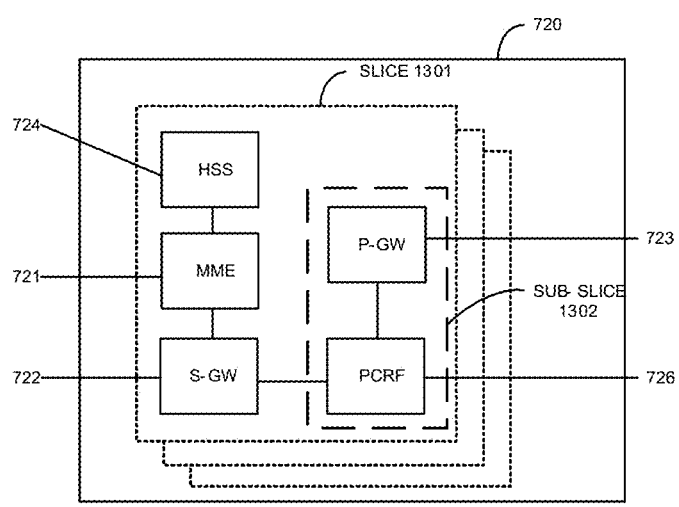
FIG. 13 illustrates components of an exemplary core network in accordance with various embodiments.

FIG. 13 illustrates components of a core network in accordance with various embodiments. The components of the CN 720 may be implemented in one physical node or separate physical nodes including components to read and execute instructions from a machine-readable or computer-readable medium (e.g., a non-transitory machine-readable storage medium). In embodiments, the components of CN 720 may be implemented in a same or similar manner as discussed herein with regard to the components of CN 720. In some embodiments, NFV is utilized to virtualize any or all of the above-described network node functions via executable instructions stored in one or more computer-readable storage mediums (described in further detail below). A logical instantiation of the CN 720 may be referred to as a network slice 1301, and individual logical instantiations of the CN 720 may provide specific network capabilities and network characteristics. A logical instantiation of a portion of the CN 720 may be referred to as a network sub-slice 1302 (e.g., the network sub-slice 1302 is shown to include the P-GW 723 and the PCRF 726).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 7B), a network slice always comprises a RAN part and a CN part. The support of network slicing relies on the principle that traffic for different slices is handled by different PDU sessions. The network can realize the different network slices by scheduling and also by providing different L1/L2 configurations. The UE 701 provides assistance information for network slice selection in an appropriate RRC message, if it has been provided by NAS. While the network can support large number of slices, the UE need not support more than 8 slices simultaneously.

A network slice may include the CN 720 control plane and user plane NFs, NG-RANs 710 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 701 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 721 instance serving an individual UE 701 may belong to each of the network slice instances serving that UE.

Network Slicing in the NG-RAN 710 involves RAN slice awareness. RAN slice awareness includes differentiated handling of traffic for different network slices, which have been pre-configured. Slice awareness in the NG-RAN 710 is introduced at the PDU session level by indicating the S-NSSAI corresponding to a PDU session in all signalling that includes PDU session resource information. How the NG-RAN 710 supports the slice enabling in terms of NG-RAN functions (e.g., the set of network functions that comprise each slice) is implementation dependent. The NG-RAN 710 selects the RAN part of the network slice using assistance information provided by the UE 701 or the 5GC 720, which unambiguously identifies one or more of the pre-configured network slices in the PLMN. The NG-RAN 710 also supports resource management and policy enforcement between slices as per SLAs. A single NG-RAN node may support multiple slices, and the NG-RAN 710 may also apply an appropriate RRM policy for the SLA in place to each supported slice. The NG-RAN 710 may also support QoS differentiation within a slice.

The NG-RAN 710 may also use the UE assistance information for the selection of an AMF 721 during an initial attach, if available. The NG-RAN 710 uses the assistance information for routing the initial NAS to an AMF 721. If the NG-RAN 710 is unable to select an AMF 721 using the assistance information, or the UE 701 does not provide any such information, the NG-RAN 710 sends the NAS signaling to a default AMF 721, which may be among a pool of AMFs 721. For subsequent accesses, the UE 701 provides a temp ID, which is assigned to the UE 701 by the 5GC 720, to enable the NG-RAN 710 to route the NAS message to the appropriate AMF 721 as long as the temp ID is valid. The NG-RAN 710 is aware of, and can reach, the AMF 721 that is associated with the temp ID. Otherwise, the method for initial attach applies.

The NG-RAN 710 supports resource isolation between slices. NG-RAN 710 resource isolation may be achieved by means of RRM policies and protection mechanisms that should avoid that shortage of shared resources if one slice breaks the service level agreement for another slice. In some implementations, it is possible to fully dedicate NG-RAN 710 resources to a certain slice. How NG-RAN 710 supports resource isolation is implementation dependent.

Some slices may be available only in part of the network. Awareness in the NG-RAN 710 of the slices supported in the cells of its neighbors may be beneficial for inter-frequency mobility in connected mode. The slice availability may not change within the UE's registration area. The NG-RAN 710 and the 5GC 720 are responsible to handle a service request for a slice that may or may not be available in a given area. Admission or rejection of access to a slice may depend on factors such as support for the slice, availability of resources, support of the requested service by NG-RAN 710.

The UE 701 may be associated with multiple network slices simultaneously. In case the UE 701 is associated with multiple slices simultaneously, only one signalling connection is maintained, and for intra-frequency cell reselection, the UE 701 tries to camp on the best cell. For inter-frequency cell reselection, dedicated priorities can be used to control the frequency on which the UE 701 camps. The 5GC 720 is to validate that the UE 701 has the rights to access a network slice. Prior to receiving an Initial Context Setup Request message, the NG-RAN 710 may be allowed to apply some provisional/local policies, based on awareness of a particular slice that the UE 701 is requesting to access. During the initial context setup, the NG-RAN 710 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 14:
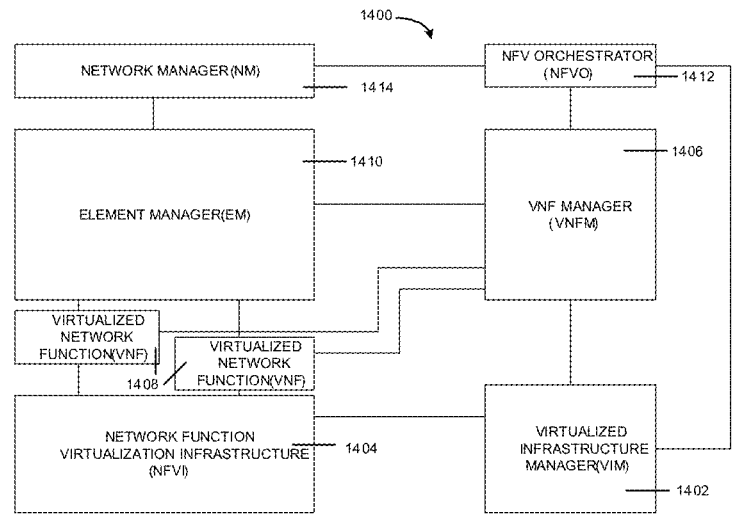
FIG. 14 is a block diagram illustrating exemplary components, according to some example embodiments, of a system to support NFV.

FIG. 14 is a block diagram illustrating components, according to some example embodiments, of a system 1400 to support NFV. The system 1400 is illustrated as including a VIM 1402, an NFVI 1404, an VNFM 1406, VNFs 1408, an EM 1410, an NFVO 1412, and a NM 1414.

The VIM 1402 manages the resources of the NFVI 1404. The NFVI 1404 can include physical or virtual resources and applications (including hypervisors) used to execute the system 1400. The VIM 1402 may manage the life cycle of virtual resources with the NFVI 1404 (e.g., creation, maintenance, and tear down of VMs associated with one or more physical resources), track VM instances, track performance, fault and security of VM instances and associated physical resources, and expose VM instances and associated physical resources to other management systems.

The VNFM 1406 may manage the VNFs 1408. The VNFs 1408 may be used to execute EPC components/functions. The VNFM 1406 may manage the life cycle of the VNFs 1408 and track performance, fault and security of the virtual aspects of VNFs 1408. The EM 1410 may track the performance, fault and security of the functional aspects of VNFs 1408. The tracking data from the VNFM 1406 and the EM 1410 may comprise, for example, PM data used by the VIM 1402 or the NFVI 1404. Both the VNFM 1406 and the EM 1410 can scale up/down the quantity of VNFs of the system 1400.

The NFVO 1412 may coordinate, authorize, release and engage resources of the NFVI 1404 in order to provide the requested service (e.g., to execute an EPC function, component, or slice). The NM 1414 may provide a package of end-user functions with the responsibility for the management of a network, which may include network elements with VNFs, non-virtualized network functions, or both (management of the VNFs may occur via the EM 1410).

Figure 15:
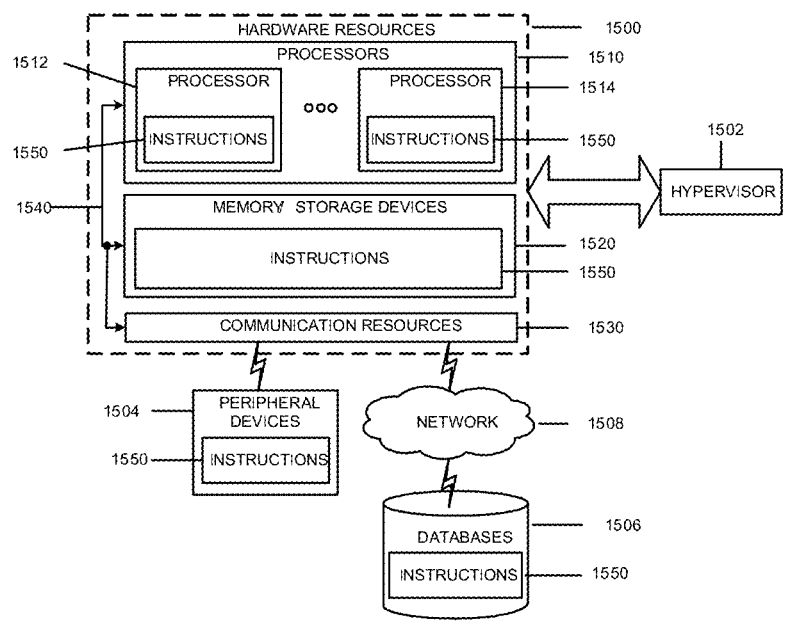
FIG. 15 depicts a block diagram illustrating exemplary components, according to some example embodiments, able to read instructions from a machine-readable or computer-readable medium (e.g., a non-transitory machine-readable storage medium) and perform any one or more of the methodologies discussed herein.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1502 may be executed to provide an execution environment for one or more network slices/sub-slices to utilize the hardware resources 1500. A "virtualized resource" may refer to compute, storage, and/or network resources provided by virtualization infrastructure to an application, device, system, etc.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section Examples Example 1 is an apparatus for a user equipment (UE) device, including baseband circuitry having a radio frequency (RF) interface and one or more processors. The RF interface is configured to receive downlink signals during a plurality of downlink slots, wherein signals in each downlink slot are received according to a transmission configuration indication (TCI) that is mapped to a unique TCI-State in a set of preconfigured TCI-States assigned to the downlink slot. The one or more processors are configured to determine one or more candidate TCIs for a downlink slot; determine a scheduling offset between a physical downlink shared channel (PDSCH) and a physical downlink control channel (PDCCH); prioritize the candidate TCIs based on the scheduling offset; identify a highest priority candidate TCI; and select the highest priority candidate TCI for receiving the PDSCH.

Example 2 includes the subject matter of example 1, including or omitting optional elements, wherein the one or more processors are configured to: identify a first TCI associated with the PDSCH as a first candidate TCI; identify a second TCI associated with a downlink reference signal multiplexed with the PDSCH as a second candidate TCI; and when the scheduling offset is below a threshold, assign a lowest priority to the first candidate TCI.

Example 3 includes the subject matter of example 1, including or omitting optional elements, wherein the one or more processors are configured to: identify a first TCI associated with the PDSCH as a first candidate TCI; identify a second TCI associated with a first downlink reference signal multiplexed with the PDSCH as a second candidate TCI; and when the scheduling offset is above a threshold, assign a higher priority to the first candidate TCI than the second candidate TCI.

Example 4 includes the subject matter of example 3, including or omitting optional elements, wherein the first downlink reference signal includes a periodic channel state information (CSI)-reference signal (RS) or a synchronization signal block (SSB) or a physical downlink control channel (PDCCH).

Example 5 includes the subject matter of example 3, including or omitting optional elements, wherein the one or more processors are configured to: identify a third TCI associated with a second downlink reference signal multiplexed with the PDSCH as a third candidate TCI; and when the scheduling offset is above a threshold, assign a higher priority to the first candidate TCI than the second candidate TCI and assign a lower priority to the first candidate TCI than the third candidate TCI.

Example 6 includes the subject matter of example 5, including or omitting optional elements, wherein the second downlink reference signal includes an aperiodic CSI-RS.

Example 7 includes the subject matter of example 5, including or omitting optional elements, wherein the second downlink reference signal includes a PDSCH scheduled by a PDCCH scrambled by system information (SI)-radio network transmission indicator (RNTI) or a PDSCH scheduled by a PDCCH scrambled by paging (P)-RNTI.

Example 8 includes the subject matter of example 1, including or omitting optional elements, wherein the one or more processors are configured to: identify a first transmission configuration indicator (TCI) associated with the PDSCH as a first candidate TCI; and identify a second TCI associated with a first downlink reference signal multiplexed with the PDSCH as a second candidate TCI, wherein the first downlink reference signal includes a signal multiplexed with the PDSCH in a frequency division multiplexing or time division multiplexing manner.

Example 9 includes the subject matter of example 1, including or omitting optional elements, wherein the one or more processors are configured to, when the scheduling offset is above a threshold and when a media access control (MAC) control element (CE) reconfiguration of the set of preconfigured TCIs is acknowledged prior to when the PDCCH is transmitted and a period to apply new TCI-States expires after the PDCCH is transmitted but prior to when the PDSCH is transmitted, select the TCI from the set of preconfigured TCI-States as defined when the PDCCH is transmitted.

Example 10 includes the subject matter of example 1, including or omitting optional elements, wherein the one or more processors are configured to, when the scheduling offset is above a threshold and when a media access control (MAC) control element (CE) reconfiguration of the set of preconfigured TCIs was acknowledged prior to the PDCCH and a period to apply new TCI-States expires after the PDCCH is transmitted but prior to when the PDSCH is transmitted, select the TCI from the set of preconfigured TCI-States as defined when the PDSCH is transmitted.

Example 11 includes the subject matter of example 1, including or omitting optional elements, wherein the one or more processors are configured to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted:

determine that no TCI is present in the PDCCH; and identify a CORESET TCI associated with the PDCCH as the highest priority candidate, wherein the identified CORESET TCI is selected from the CORESET as defined prior to the MAC CE reconfiguration.

Example 12 includes the subject matter of example 1, including or omitting optional elements, wherein the one or more processors are configured to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted: determine that no TCI is present in the PDCCH; and identify a CORESET TCI associated with the PDCCH as the highest priority candidate, wherein the identified CORESET TCI is selected from the CORESET as defined after to the MAC CE reconfiguration.

Example 13 includes the subject matter of example 1, including or omitting optional elements, wherein the one or more processors are configured to, when the scheduling offset is above a threshold and when a multi-slot PDSCH is being received, select a TCI from the set of preconfigured TCI-States as defined when the PDCCH is transmitted.

Example 14 includes the subject matter of example 1, including or omitting optional elements, wherein the one or more processors are configured to, when the scheduling offset is above a threshold and when a multi-slot PDSCH is being received select a TCI from a set of predetermined TCI-States associated with a starting slot of the PDSCH.

Example 15 includes the subject matter of example 1, including or omitting optional elements, wherein the one or more processors are configured to, when the scheduling offset is above a threshold and when a multi-slot PDSCH is being received, select a TCI from respective sets of predetermined TCI-States associated with each respective slot of the multi-slot PDSCH.

Example 16 is an apparatus for a gNB device, including baseband circuitry having a radio frequency (RF) interface configured to transmit PDSCH during a plurality of N downlink slots, wherein N is greater than 1, further wherein signals in each downlink slot are transmitted according to a transmission configuration indication (TCI) that identifies a unique TCI-State in a set of predetermined TCI-States assigned to the downlink slots; and one or more processors configured to configure a set of predetermined TCIs associated with a set of N downlink slots.

Example 17 is one or more computer-readable media having instructions that, when executed, cause a user equipment (UE) device to: determine one or more candidate TCIs for a downlink slot; determine a scheduling offset between a physical downlink shared channel (PDSCH) and a physical downlink control channel (PDCCH); prioritize the candidate TCIs based on the scheduling offset; identify a highest priority candidate TCI; and select the highest priority candidate TCI for receiving the PDSCH.

Example 18 includes the subject matter of example 17, including or omitting optional elements, wherein the instructions, when executed, cause the UE device to: identify a first TCI associated with the PDSCH as a first candidate TCI; identify a second TCI associated with a downlink reference signal multiplexed with the PDSCH as a second candidate TCI; and when the scheduling offset is below a threshold, assign a lowest priority to the first candidate TCI.

Example 19 includes the subject matter of example 17, including or omitting optional elements, wherein the instructions, when executed, cause the UE device to: identify a first TCI associated with the PDSCH as a first candidate TCI; identify a second TCI associated with a first downlink reference signal multiplexed with the PDSCH as a second candidate TCI; and when the scheduling offset is above a threshold, assign a higher priority to the first candidate TCI than the second candidate TCI.

Example 20 includes the subject matter of example 19, including or omitting optional elements, wherein the first downlink reference signal includes a periodic channel state information (CSI)-reference signal (RS) or a synchronization signal block (SSB) or a physical downlink control channel (PDCCH).

Example 21 includes the subject matter of example 19, including or omitting optional elements, wherein the instructions, when executed, cause the UE device to: identify a third TCI associated with a second downlink reference signal multiplexed with the PDSCH as a third candidate TCI; and when the scheduling offset is above a threshold, assign a higher priority to the first candidate TCI than the second candidate TCI and assign a lower priority to the first candidate TCI than the third candidate TCI.

Example 22 includes the subject matter of example 21, including or omitting optional elements, wherein the second downlink reference signal includes an aperiodic CSI-RS.

Example 23 includes the subject matter of example 21, including or omitting optional elements, wherein the second downlink reference signal includes a PDSCH scheduled by a PDCCH scrambled by system information (SI)-radio network transmission indicator (RNTI) or a PDSCH scheduled by a PDCCH scrambled by paging (P)-RNTI.

Example 24 includes the subject matter of example 17, including or omitting optional elements, wherein the instructions, when executed, cause the UE device to: identify a first transmission configuration indicator (TCI) associated with the PDSCH as a first candidate TCI; and identify a second TCI associated with a first downlink reference signal multiplexed with the PDSCH as a second candidate TCI, wherein the first downlink reference signal includes a signal multiplexed with the PDSCH in a frequency division multiplexing or time division multiplexing manner.

Example 25 includes the subject matter of example 17, including or omitting optional elements, wherein the instructions, when executed, cause the UE device to, when the scheduling offset is above a threshold and when a media access control (MAC) control element (CE) reconfiguration of the set of preconfigured TCIs is acknowledged prior to when the PDCCH is transmitted and a period to apply new TCI-States expires after the PDCCH is transmitted but prior to when the PDSCH is transmitted, select the TCI from the set of preconfigured TCI-States as defined when the PDCCH is transmitted.

Example 26 includes the subject matter of example 17, including or omitting optional elements, wherein the instructions, when executed, cause the UE device to, when the scheduling offset is above a threshold and when a media access control (MAC) control element (CE) reconfiguration of the set of preconfigured TCIs was acknowledged prior to the PDCCH and a period to apply new TCI-States expires after the PDCCH is transmitted but prior to when the PDSCH is transmitted, select the TCI from the set of preconfigured TCI-States as defined when the PDSCH is transmitted.

Example 27 includes the subject matter of example 17, including or omitting optional elements, wherein the instructions, when executed, cause the UE device to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted: determine that no TCI is present in the PDCCH; and identify a CORESET TCI associated with the PDCCH as the highest priority candidate, wherein the identified CORESET TCI is selected from the CORESET as defined prior to the MAC CE configuration.

Example 28 includes the subject matter of example 17, including or omitting optional elements, wherein the instructions, when executed, cause the UE device to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted determine that no TCI is present in the PDCCH; and identify a CORESET TCI associated with the PDCCH as the highest priority candidate, wherein the identified CORESET TCI is selected from the CORESET as defined after to the MAC CE reconfiguration.

Example 29 includes the subject matter of example 17, including or omitting optional elements, wherein the instructions, when executed, cause the UE device to, when the scheduling offset is above a threshold and when a multi-slot PDSCH is being received, select a TCI from the set of preconfigured TCI-States as defined when the PDCCH is transmitted.

Example 30 includes the subject matter of example 17, including or omitting optional elements, wherein the instructions, when executed, cause the UE device to, when the scheduling offset is above a threshold and when a multi-slot PDSCH is being received, select a TCI from a set of predetermined TCI-States associated with a starting slot of the PDSCH.

Example 31 includes the subject matter of example 17, including or omitting optional elements, wherein the instructions, when executed, cause the UE device to, when the scheduling offset is above a threshold and when a multi-slot PDSCH is being received, select a TCI from respective sets of predetermined TCI-States associated with each respective slot of the multi-slot PDSCH.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.
3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement, Control Element
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS Demodulation Reference Signal
DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunneling Protocol for User Plane
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http /1.1 over SSL, i.e. port 543)
I-Block Information Block
ICCID Integrated Circuit Card Identification
ICIC Inter-Cell Interference Coordination
ID Identity, identifier
IDFT Inverse Discrete Fourier Transform
IE Information element
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol Ipsec IP Security, Internet Protocol Security
IP-CAN IP-Connectivity Access Network
IP-M IP Multicast
IPv4 Internet Protocol Version 5
IPv6 Internet Protocol Version 6
IR Infrared
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 2 (physical layer)
L1-RSRP Layer 2 reference signal received power
L2 Layer 3 (data link layer)
L3 Layer 4 (network layer)
LAA Licensed Assisted Access
LAN Local Area Network
LBT Listen Before Talk
LCM LifeCycle Management
LCR Low Chip Rate
LCS Location Services
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS Multi Protocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massize MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1 AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)

SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power In the present disclosure, "SMTC" refers to an SSB-based measurement timing configuration configured by SSB-MeasurementTimingConfiguration;

"SSB" refers to an SS/PBCH block; "field" may refer to individual contents of an information element;

"information element" refers to a structural element containing a single or multiple fields;

a "Primary Cell" refers to the MCG cell, operating on the primary frequency, in which the UE either performs the initial connection establishment procedure or initiates the connection re-establishment procedure;

a "Primary SCG Cell" refers to the SCG cell in which the UE performs random access when performing the Reconfiguration with Sync procedure for DC operation;

a "Secondary Cell" refers to a cell providing additional radio resources on top of a Special Cell for a UE configured with CA;

a "Secondary Cell Group" refers to the subset of serving cells including the PSCell and zero or more secondary cells for a UE configured with DC;

a "Serving Cell" refers to the primary cell for a UE in RRC_CONNECTED not configured with CA/DC there is only one serving cell comprising of the primary cell;

a "serving cell" or "serving cells" refers to the set of cells comprising the Special Cell(s) and all secondary cells for a UE in RRC_CONNECTED configured with CA/DC; and a "Special Cell" refers to the PCell of the MCG or the PSCell of the SCG for DC operation; otherwise, the term "Special Cell" refers to the PCell.

We claim:

1. An apparatus for a user equipment (UE) device, comprising baseband circuitry having:
   a radio frequency (RF) interface configured to receive downlink signals during a plurality of downlink slots, wherein signals in each downlink slot are received according to a transmission configuration indication (TCI) that is mapped to a unique TCI-State in a set of preconfigured TCI-States assigned to the downlink slot; and
   one or more processors configured to:
      determine one or more candidate TCIs for a downlink slot;
      determine a scheduling offset between a physical downlink shared channel (PDSCH) and a physical downlink control channel (PDCCH);
      prioritize the candidate TCIs based on the scheduling offset;
      identify a highest priority candidate TCI; and
      select the highest priority candidate TCI for receiving the PDSCH.

2. The apparatus of claim 1, wherein the one or more processors are configured to:
   identify a first TCI associated with the PDSCH as a first candidate TCI;
   identify a second TCI associated with a downlink reference signal multiplexed with the PDSCH as a second candidate TCI; and
   when the scheduling offset is below a threshold, assign a lowest priority to the first candidate TCI.

3. The apparatus of claim 1, wherein the one or more processors are configured to:
   identify a first TCI associated with the PDSCH as a first candidate TCI;
   identify a second TCI associated with a first downlink reference signal multiplexed with the PDSCH as a second candidate TCI; and
   when the scheduling offset is above a threshold, assign a higher priority to the first candidate TCI than the second candidate TCI.

4. The apparatus of claim 3, wherein the first downlink reference signal comprises a periodic channel state information (CSI)-reference signal (RS) or a synchronization signal block (SSB) or a physical downlink control channel (PDCCH).

5. The apparatus of claim 3, wherein the one or more processors are configured to:
   identify a third TCI associated with a second downlink reference signal multiplexed with the PDSCH as a third candidate TCI; and
   when the scheduling offset is above a threshold, assign a higher priority to the first candidate TCI than the second candidate TCI and assign a lower priority to the first candidate TCI than the third candidate TCI.

6. The apparatus of claim 5, wherein the second downlink reference signal comprises an aperiodic CSI-RS.

7. The apparatus of claim 5, wherein the second downlink reference signal comprises a PDSCH scheduled by a PDCCH scrambled by system information (SI)-radio network transmission indicator (RNTI) or a PDSCH scheduled by a PDCCH scrambled by paging (P)-RNTI.

8. The apparatus of claim 1, wherein the one or more processors are configured to:
   identify a first transmission configuration indicator (TCI) associated with the PDSCH as a first candidate TCI; and
   identify a second TCI associated with a first downlink reference signal multiplexed with the PDSCH as a second candidate TCI, wherein the first downlink reference signal comprises a signal multiplexed with the PDSCH in a frequency division multiplexing or time division multiplexing manner.

9. The apparatus of claim 1, wherein the one or more processors are configured to, when the scheduling offset is above a threshold and when a media access control (MAC) control element (CE) reconfiguration of the set of preconfigured TCIs is acknowledged prior to when the PDCCH is transmitted and a period to apply new TCI-States expires after the PDCCH is transmitted but prior to when the PDSCH is transmitted:
   select the TCI from the set of preconfigured TCI-States as defined when the PDCCH is transmitted.

10. The apparatus of claim 1, wherein the one or more processors are configured to, when the scheduling offset is above a threshold and when a media access control (MAC) control element (CE) reconfiguration of the set of preconfigured TCIs was acknowledged prior to the PDCCH and a period to apply new TCI-States expires after the PDCCH is transmitted but prior to when the PDSCH is transmitted:
   select the TCI from the set of preconfigured TCI-States as defined when the PDSCH is transmitted.

11. The apparatus of claim 1, wherein the one or more processors are configured to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted:
   determine that no TCI is present in the PDCCH; and
   identify a CORESET TCI associated with the PDCCH as the highest priority candidate, wherein the identified CORESET TCI is selected from the CORESET as defined prior to the MAC CE reconfiguration.

12. The apparatus of claim 1, wherein the one or more processors are configured to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted:

determine that no TCI is present in the PDCCH; and
identify a CORESET TCI associated with the PDCCH as the highest priority candidate, wherein the identified CORESET TCI is selected from the CORESET as defined after to the MAC CE reconfiguration.

13. The apparatus of claim 1, wherein the one or more processors are configured to, when the scheduling offset is above a threshold and when a multi-slot PDSCH is being received:
select a TCI from the set of preconfigured TCI-States as defined when the PDCCH is transmitted.

14. The apparatus of claim 1, wherein the one or more processors are configured to, when the scheduling offset is above a threshold and when a multi-slot PDSCH is being received:
select a TCI from a set of predetermined TCI-States associated with a starting slot of the PDSCH.

15. The apparatus of claim 1, wherein the one or more processors are configured to, when the scheduling offset is above a threshold and when a multi-slot PDSCH is being received:
select a TCI from respective sets of predetermined TCI-States associated with each respective slot of the multi-slot PDSCH.

16. One or more non-transitory computer-readable media having instructions that, when executed, cause a user equipment (UE) device to:
determine one or more candidate TCIs for a downlink slot;
determine a scheduling offset between a physical downlink shared channel (PDSCH) and a physical downlink control channel (PDCCH);
prioritize the candidate TCIs based on the scheduling offset;
identify a highest priority candidate TCI; and
select the highest priority candidate TCI for receiving the PDSCH.

17. The non-transitory computer-readable media of claim 16, wherein the instructions, when executed, cause the UE device to:
identify a first TCI associated with the PDSCH as a first candidate TCI;
identify a second TCI associated with a downlink reference signal multiplexed with the PDSCH as a second candidate TCI; and
when the scheduling offset is below a threshold, assign a lowest priority to the first candidate TCI.

18. The non-transitory computer-readable media of claim 16, wherein the instructions, when executed, cause the UE device to:
identify a first TCI associated with the PDSCH as a first candidate TCI;
identify a second TCI associated with a first downlink reference signal multiplexed with the PDSCH as a second candidate TCI; and
when the scheduling offset is above a threshold, assign a higher priority to the first candidate TCI than the second candidate TCI.

19. The non-transitory computer-readable media of claim 18, wherein the first downlink reference signal comprises a periodic channel state information (CSI)-reference signal (RS) or a synchronization signal block (SSB) or a physical downlink control channel (PDCCH).

20. The non-transitory computer-readable media of claim 18, wherein the instructions, when executed, cause the UE device to:
identify a third TCI associated with a second downlink reference signal multiplexed with the PDSCH as a third candidate TCI; and
when the scheduling offset is above a threshold, assign a higher priority to the first candidate TCI than the second candidate TCI and assign a lower priority to the first candidate TCI than the third candidate TCI.

21. The non-transitory computer-readable media of claim 20, wherein the second downlink reference signal comprises an aperiodic CSI-RS.

22. The non-transitory computer-readable media of claim 20, wherein the second downlink reference signal comprises a PDSCH scheduled by a PDCCH scrambled by system information (SI)-radio network transmission indicator (RNTI) or a PDSCH scheduled by a PDCCH scrambled by paging (P)-RNTI.

23. The non-transitory computer-readable media of claim 16, wherein the instructions, when executed, cause the UE device to:
identify a first transmission configuration indicator (TCI) associated with the PDSCH as a first candidate TCI; and
identify a second TCI associated with a first downlink reference signal multiplexed with the PDSCH as a second candidate TCI, wherein the first downlink reference signal comprises a signal multiplexed with the PDSCH in a frequency division multiplexing or time division multiplexing manner.

24. The non-transitory computer-readable media of claim 16, wherein the instructions, when executed, cause the UE device to, when the scheduling offset is above a threshold and when a media access control (MAC) control element (CE) reconfiguration of the set of preconfigured TCIs is acknowledged prior to when the PDCCH is transmitted and a period to apply new TCI-States expires after the PDCCH is transmitted but prior to when the PDSCH is transmitted:
select the TCI from the set of preconfigured TCI-States as defined when the PDCCH is transmitted.

25. The non-transitory computer-readable media of claim 16, wherein the instructions, when executed, cause the UE device to, when the scheduling offset is above a threshold and when a media access control (MAC) control element (CE) reconfiguration of the set of preconfigured TCIs was acknowledged prior to the PDCCH and a period to apply new TCI-States expires after the PDCCH is transmitted but prior to when the PDSCH is transmitted:
select the TCI from the set of preconfigured TCI-States as defined when the PDSCH is transmitted.

26. The non-transitory computer-readable media of claim 16, wherein the instructions, when executed, cause the UE device to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted:
determine that no TCI is present in the PDCCH; and
identify a CORESET TCI associated with the PDCCH as the highest priority candidate, wherein the identified CORESET TCI is selected from the CORESET as defined prior to the MAC CE configuration.

27. The non-transitory computer-readable media of claim 16, wherein the instructions, when executed, cause the UE device to, when the scheduling offset is above a threshold and when a media access control (MAC) control element (CE) reconfiguration of control resource set (CORESET) of TCIs associated with the PDCCH was acknowledged prior to the PDCCH and a period to apply new TCI-States expires after the PDCCH is transmitted but prior to when the PDSCH is transmitted:

determine that no TCI is present in the PDCCH; and
 identify a CORESET TCI associated with the PDCCH as the highest priority candidate, wherein the identified CORESET TCI is selected from the CORESET as defined after to the MAC CE reconfiguration.

28. The non-transitory computer-readable media of claim 16, wherein the instructions, when executed, cause the UE device to, when the scheduling offset is above a threshold and when a multi-slot PDSCH is being received:

select a TCI from the set of preconfigured TCI-States as defined when the PDCCH is transmitted.

29. The non-transitory computer-readable media of claim 16, wherein the instructions, when executed, cause the UE device to, when the scheduling offset is above a threshold and when a multi-slot PDSCH is being received:

select a TCI from a set of predetermined TCI-States associated with a starting slot of the PDSCH.

30. The non-transitory computer-readable media of claim 16, wherein the instructions, when executed, cause the UE device to, when the scheduling offset is above a threshold and when a multi-slot PDSCH is being received:

select a TCI from respective sets of predetermined TCI-States associated with each respective slot of the multi-slot PDSCH.

\* \* \* \* \*